(12) United States Patent
Sugaya et al.

(10) Patent No.: US 12,369,144 B2
(45) Date of Patent: Jul. 22, 2025

(54) COMMUNICATION DEVICE AND COMMUNICATION METHOD

(71) Applicant: SONY GROUP CORPORATION, Tokyo (JP)

(72) Inventors: Shigeru Sugaya, Tokyo (JP); Kosuke Aio, Tokyo (JP); Ren Sugai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 369 days.

(21) Appl. No.: 17/753,445

(22) PCT Filed: Aug. 28, 2020

(86) PCT No.: PCT/JP2020/032559
§ 371 (c)(1),
(2) Date: Mar. 3, 2022

(87) PCT Pub. No.: WO2021/049322
PCT Pub. Date: Mar. 18, 2021

(65) Prior Publication Data
US 2022/0295488 A1 Sep. 15, 2022

(30) Foreign Application Priority Data
Sep. 12, 2019 (JP) .................. 2019-166035

(51) Int. Cl.
*H04W 72/0453* (2023.01)
*H04W 16/14* (2009.01)
*H04W 48/18* (2009.01)

(52) U.S. Cl.
CPC .............. *H04W 72/0453* (2013.01)

(58) Field of Classification Search
CPC . H04W 72/0453; H04W 16/14; H04W 48/18; H04W 72/02; H04W 40/244;
(Continued)

(56) References Cited

U.S. PATENT DOCUMENTS 9,191,955 B2 * 11/2015 Lim ................. H04W 72/0453
9,307,533 B2 * 4/2016 Adachi ................. H04W 48/08
(Continued)

FOREIGN PATENT DOCUMENTS

EP 3534655 A1 9/2019
JP 2017-208784 A 11/2017
(Continued)

OTHER PUBLICATIONS

International Search Report and Written Opinion of PCT Application No. PCT/JP2020/032559, issued on Nov. 10, 2020, 08 pages of ISRWO.

*Primary Examiner* — Sai Aung
(74) *Attorney, Agent, or Firm* — CHIP LAW GROUP

(57) ABSTRACT

The present technology relates to a communication device and a communication method capable of curbing deterioration of frequency utilization efficiency. A communication device including a control unit configured to set a first frequency channel group used at the time of simultaneously transmitting data in cooperation with another communication device constituting another network, to set a second frequency channel group used for communication in a host network, and to dynamically control bandwidths of frequency bands in the first frequency channel group and the second frequency channel group is provided. The present technology can be applied to, for example, a wireless LAN system.

18 Claims, 23 Drawing Sheets

(58) Field of Classification Search
CPC ..... H04W 28/20; H04W 72/04; H04W 72/23; H04W 74/006
See application file for complete search history.

(56) References Cited

U.S. PATENT DOCUMENTS

| | | | |
|---|---|---|---|
| 2003/0119511 A1* | 6/2003 | Shin | H04W 36/14 455/439 |
| 2005/0030932 A1* | 2/2005 | Kelly | H01Q 1/1257 370/321 |
| 2009/0092111 A1* | 4/2009 | Horn | H04W 48/02 370/338 |
| 2015/0288428 A1 | 10/2015 | Choi | |
| 2017/0373899 A1* | 12/2017 | Sato | H04L 5/0048 |
| 2023/0042638 A1* | 2/2023 | Kishida | H04W 16/14 |

FOREIGN PATENT DOCUMENTS

| | | |
|---|---|---|
| JP | 2018-525917 A | 9/2018 |
| JP | 2020-515112 A | 5/2020 |
| TW | 201436610 A | 9/2014 |
| TW | 201922046 A | 6/2019 |
| WO | WO-2016026112 A1 | 2/2016 |
| WO | 2017/023464 A1 | 2/2017 |
| WO | 2018/136254 A1 | 7/2018 |

* cited by examiner

Fig. 12

| Element ID (IE) | Length | Capability | Operation Type | Primary Channel | Coordinate Operation Channel Bitmaps | BSS Operation Channel Bitmaps |

Fig. 13

| Frame Control | Duration | Transmit Address | Receive Address | Operation Type | Primary Channel | Coordinate Operation Channel Bitmaps | BSS Operation Channel Bitmaps |

| Coordinate Tx Owner | Coordinate Tx Slave | Temporary Use | Trigger Tx Available | Reserved |
|---|---|---|---|---|
| 0 | 0 | 0 | 0 | 0000 |

| Frame Control | Duration | Transmit Address | Receive Address | Operation Type | Target STA Address | Request Bandwidth | Coordinate Operation Channel Bitmaps |
|---|---|---|---|---|---|---|---|

| Coordinate Tx Owner | Coordinate Tx Slave | Temporary Use | Trigger Tx Available | Reserved |
|---|---|---|---|---|
| 1 | 0 | 0 | 1/0 | 0000 |

Fig. 14

| Frame Control | Duration | Transmit Address | Receive Address | Operation Type | Target STA Address | Grant Bandwidth | Coordinate Operation Channel Bitmaps |
|---|---|---|---|---|---|---|---|

| Coordinate Tx Owner | Coordinate Tx Slave | Temporary Use | Trigger Tx Available | Reserved |
|---|---|---|---|---|
| 0 | 1 | 0 | 0/1 | 0000 |

Fig. 15

| Frame Control | Duration | Transmit Address | Receive Address | Operation Type | Target STA Address | Request Bandwidth | Coordinate Operation Channel Bitmaps |
|---|---|---|---|---|---|---|---|

| Coordinate Tx Owner | Coordinate Tx Slave | Temporary Use | Trigger Tx Available | Reserved |
|---|---|---|---|---|
| 1 | 0 | 1 | 0 | 0000 |

| Frame Control | Duration | Transmit Address | Receive Address | Operation Type | Target STA Address | Grant Bandwidth | Coordinate Operation Channel Bitmaps |
|---|---|---|---|---|---|---|---|

| Coordinate Tx Owner | Coordinate Tx Slave | Temporary Use | Trigger Tx Available | Reserved |
|---|---|---|---|---|
| 0 | 1 | 1 | 0 | 0000 |

Fig. 18

| Frame Control | Duration | Transmit Address | Receive Address | Operation Type | Primary Channel | Coordinate Operation Channel Bitmaps | BSS Operation Channel Bitmaps |
|---|---|---|---|---|---|---|---|

| Coordinate Tx Owner | Coordinate Tx Slave | Temporary Use | Trigger Tx Available | Reserved |
|---|---|---|---|---|
| 0 | 0 | 1 | 0 | 0000 |

COMMUNICATION DEVICE AND COMMUNICATION METHOD

CROSS REFERENCE TO RELATED APPLICATIONS

This application is a U.S. National Phase of International Patent Application No. PCT/JP2020/032559 filed on Aug. 28, 2020, which claims priority benefit of Japanese Patent Application No. JP 2019-166035 filed in the Japan Patent Office on Sep. 12, 2019. Each of the above-referenced applications is hereby incorporated herein by reference in its entirety.

TECHNICAL FIELD

The present technology relates to a communication device and a communication method, and particularly, to a communication device and a communication method capable of curbing deterioration of frequency utilization efficiency.

BACKGROUND ART

In a wireless communication system such as a wireless LAN system, a method of using a frequency channel over a predetermined bandwidth determined by an access point (AP) that manages a basic service set (BSS) is used.

Further, a technology with respect to coordinated transmission in which the same data is simultaneously transmitted from a plurality of access points to a single communication terminal in a wireless communication system has been proposed.

PTL 1 discloses, as a technology applicable to coordinated transmission, a technology for setting an appropriate frequency channel to be used in a plurality of modes in a communication device capable of performing communication in the plurality of modes.

CITATION LIST

Patent Literature

[PTL 1]
JP 2017-208784 A

SUMMARY

Technical Problem

Incidentally, when adjacent basic service sets are operating on the same frequency channel, one basic service set cannot perform communication using the frequency channel during a period of time for which the other basic service set is using the frequency channel for communication. Therefore, the throughput in a wireless communication system deteriorates.

On the other hand, when coordinated transmission is performed, a plurality of access points need to be operating on the same frequency channel at the timing of the coordinated transmission.

In this manner, throughput deterioration is caused when the same frequency channel is used in adjacent basic service sets, and thus there is a concern that the frequency utilization efficiency will deteriorate when coordinated transmission is performed.

In view of such circumstances, the present technology is directed to curb deterioration of frequency utilization efficiency.

Solution to Problem

A communication device of one aspect of the present technology is a communication device including a control unit configured to set a first frequency channel group used at the time of simultaneously transmitting data in cooperation with another communication device constituting another network, to set a second frequency channel group used for communication in a host network, and to dynamically control bandwidths of frequency bands in the first frequency channel group and the second frequency channel group.

A communication method of one aspect of the present technology is a communication method, using a communication device, including setting a first frequency channel group used at the time of simultaneously transmitting data in cooperation with another communication device constituting another network, setting a second frequency channel group used for communication in a host network, and dynamically controlling bandwidths of frequency bands in the first frequency channel group and the second frequency channel group.

In the communication device and the communication method of one aspect of the present technology, a first frequency channel group used at the time of simultaneously transmitting data in cooperation with another communication device constituting another network is set, a second frequency channel group used for communication in a host network is set, and bandwidths of frequency bands in the first frequency channel group and the second frequency channel group are dynamically controlled.

Further, the communication device of one aspect of the present technology may be an independent device or an internal block constituting one device.

BRIEF DESCRIPTION OF DRAWINGS

FIG. 12 is a diagram showing an example of a configuration of a BSS use channel group information element.

FIG. 13 is a diagram showing an example of a configuration of an operation channel group setting notification frame.

DESCRIPTION OF EMBODIMENTS

Figure 1:
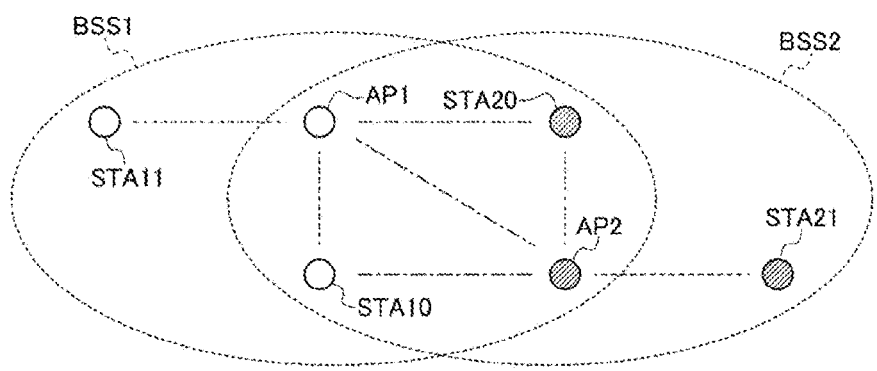
FIG. 1 is a diagram showing an example of a configuration of a wireless network according to a wireless communication system to which the present technology is applied.

Hereinafter, embodiments of the present technology will be described with reference to the drawings. Also, the description will be given in the following order.

1. Embodiments of present technology
2. Modified examples

1. Embodiments of Present Technology

A conventional wireless local area network (LAN) system adopts a method of operating a certain frequency channel over a predetermined bandwidth determined by an access point (AP) that manages a basic service set (BSS) that is a network.

Accordingly, when there is another adjacent basic service set, a frequency channel used for communication of the host basic service set is determined by avoiding the frequency channel already used.

With the recent spread of wireless LAN systems, it has become difficult to use separate frequency channels because a plurality of basic service sets are present in an adjacent (overlapping) manner.

In addition, a technology for extending a radio coverage of a system by using a plurality of access points in cooperation is used, and thus there is also an aspect that the number of frequency channels used by these access points is increased.

Furthermore, in a wireless LAN system, it is also possible to use coordinated transmission that is a technology for simultaneously transmitting the same data from a plurality of access points to a single station (STA) at the same timing.

The above-mentioned PTL 1 discloses a technology for setting an appropriate frequency channel to be used in a plurality of modes in a communication device capable of performing communication in the plurality of modes.

Specifically, as a method of setting frequency channels (wireless channels), a technology for controlling a second wireless channel such that the second wireless channel is consistent with a first wireless channel used when connection for a first communication has been established when the first communication performed via another communication device and a second communication performed by a host communication device by determining a wireless channel without using the other communication device are performed in parallel has been disclosed.

By setting operating frequency channels to the same channel in this manner, for example, a negotiation operation in the case of performing coordinated transmission can be easily performed.

Incidentally, when adjacent basic service sets are operating on the same frequency channel, there is a problem that a host basic service set cannot perform communication using the frequency channel during a time for which the other basic service set is using the frequency channel for communication.

As a result, there is a problem that the throughput (system throughput) in the wireless LAN system deteriorates.

On the other hand, when coordinated transmission in which the same data is simultaneously transmitted from a plurality of access points to a single station is performed, the plurality of access points need to operate on the same frequency channel at the timing of the coordinated transmission.

In addition, since the throughput deteriorates when the adjacent basic service sets use the same frequency channel, there is a concern that frequency utilization efficiency deteriorates when coordinated transmission is performed.

As a method of setting frequency channels (radio channels) disclosed in PTL 1 described above, the second wireless channel is controlled such that it is consistent with the first wireless channel used when connection for the first communication has been established.

That is, this setting method is a technology in which the same frequency channel is used in a plurality of modes including an infrastructure mode and a P2P mode, and a technology for separately and dynamically operating a frequency channel used for communication in a host basic service set and a frequency channel used at the time of performing coordinated transmission is not mentioned.

Accordingly, this setting method is suitable to set a frequency channel between a single access point and a plurality of stations but may cause deterioration of throughput in setting a frequency channel between a plurality of access points in a case where coordinated transmission is performed, and the like.

On the other hand, when the first wireless channel differs from the second wireless channel, there is a problem that, in execution of a negotiation operation during coordinated transmission, temporary transition to a wireless channel of the other party to execute the negotiation operation of coordinated transmission is required and thus the operation in the host basic service set cannot be performed during this time.

Therefore, the present technology devised to solve the above-mentioned problems proposes a communication method (new method) for realizing communication in which deterioration of frequency utilization efficiency is curbed at the time of performing coordinated transmission.

Hereinafter, details of a wireless communication system to which the present technology is applied will be described with reference to the drawings. In the following description, it is assumed that communication devices to which the present technology is applied include an access point (AP) and a station (STA) in a wireless LAN system that is an example of a wireless communication system.

(Example of Configuration of Wireless Communication System)

FIG. 1 shows an example of a configuration of a wireless network according to a wireless communication system to which the present technology is applied.

In the wireless network of FIG. 1, the same data can be simultaneously transmitted from a plurality of access point APs to a single station STA to carry out coordinated transmission.

In FIG. 1, an access point AP1, a station STA10, and a station STA11 are connected to a basic service set BSS1.

Here, a radio coverage of the access point AP1 is represented by a dotted line. Further, the communication devices constituting the basic service set BSS1 are represented by white circles and they are configured to have connections represented by broken lines.

On the other hand, an access point AP2, a station STA20, and a station STA21 are connected to a basic service set BSS2.

Here, a radio coverage of the access point AP2 is represented by a dotted line. Further, the communication devices constituting the basic service set BSS2 are represented by circles with diagonal lines and they are configured to have connections represented by broken lines.

In FIG. 1, the basic service set BSS1 and the basic service set BSS2 are in a positional relationship in which parts thereof overlap.

Accordingly, a communication range of the access point AP1 in the basic service set BSS1 includes the access point AP2 and the station STA20 of the basic service set BSS2. On the other hand, a communication range of the access point AP2 in the basic service set BSS2 includes the access point AP1 and the station STA10 of the basic service set BSS1.

That is, FIG. 1 shows that the access point AP1 and the access point AP2 are in a positional relationship in which they can simultaneously perform coordinated transmission to the station STA10 and the station STA20.

In the following description, a basic service set BSS that overlaps a specific basic service set BSS is also denoted by a basic service set OBSS to be distinguished from the specific basic service set BSS.

(Example of Frequency Band and Channel Allocation)

Figure 2:
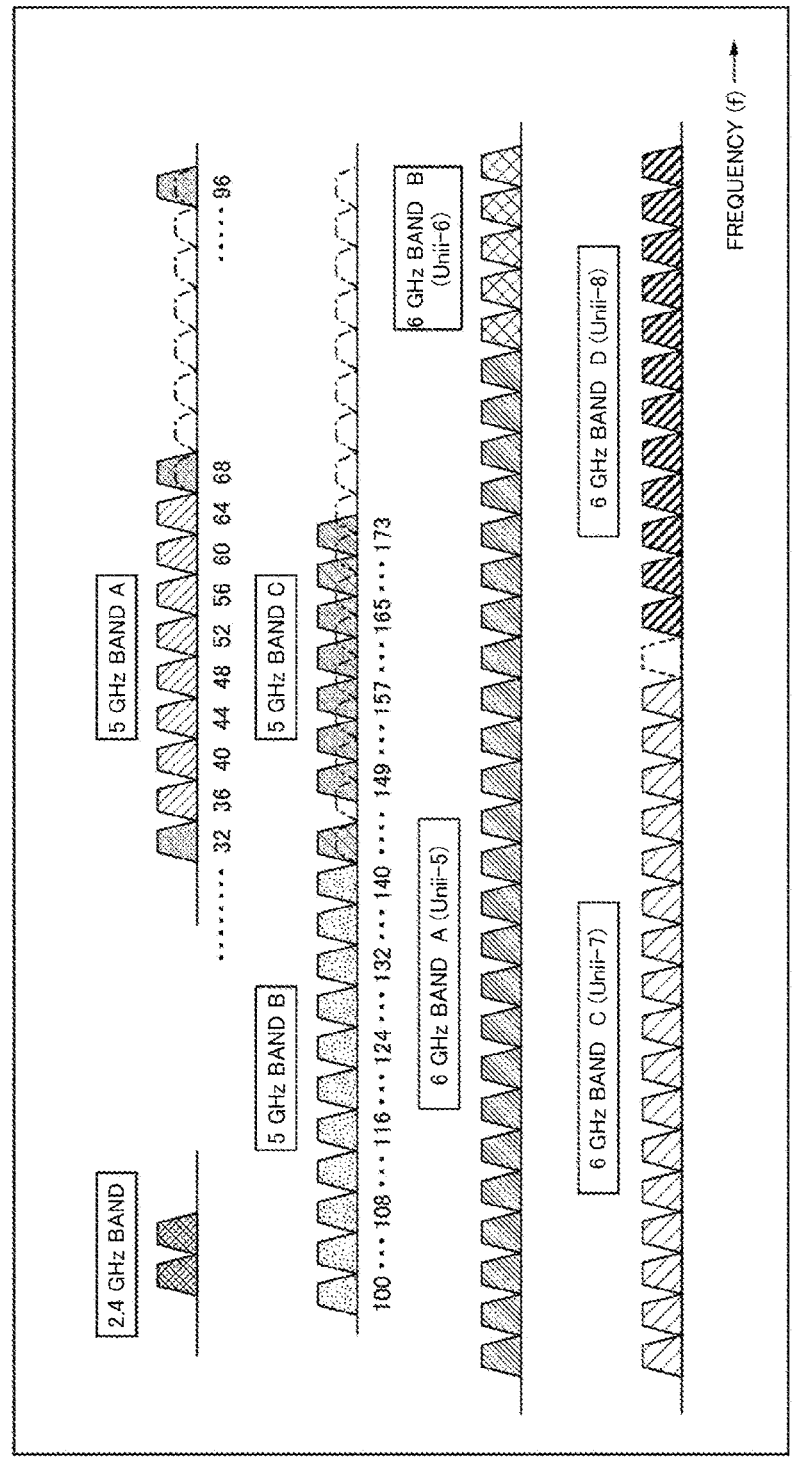
FIG. 2 is a diagram showing an example of frequency band and frequency channel allocation used in a wireless communication system.

FIG. 2 shows an example of frequency band and frequency channel allocation used in a wireless communication system to which the present technology is applied.

In a 2.4 GHz band, in the case of application to an orthogonal frequency division multiplexing (OFDM) wireless signal with a bandwidth of 20 MHz of the IEEE 802.11g standard, frequencies for at least two channels are set ("2.4 GHz band" on the top row (first row) in FIG. 2).

In a 5 GHz band, it is possible to secure a plurality of frequency channels applicable to OFDM wireless signals with a bandwidth of 20 MHz for standards such as IEEE 802.11a ("5 GHz bands A, B, and C" in the first and second rows in FIG. 2).

Here, the operation in the 5 GHz band is subject to conditions for determining available frequency bands, transmission power, and transmission availability in the legal system of each country.

Although channel numbers such as 32, 36, 40, . . . are assigned to the first and second rows in FIG. 2, 8 channels 36 to 64 and 11 channels 100 to 140 can be used in Japan.

In countries and regions other than Japan, channel 32, channel 68, channel 96, and channel 144 can also be used, and in frequency bands above that, channels 149 to 173 can also be used.

Currently, a 6 GHz band is standardized as an available frequency band ("6 GHz bands A, B, C, and D" in the third and fourth rows in FIG. 2). As a method of using this 6 GHz band in the United States, 25 channels in Unii-5 band of 6 GHz band A, 5 channels in Unii-6 band of 6 GHz band B, 17 channels in Unii-7 band of 6 GHz band C, and 12 channels in Unii-8 band of 6 GHz band D can be arranged when frequency channels with a bandwidth of 20 GHz are efficiently arranged.

(Example of setting channel group) Next, an example of setting a channel group in a wireless communication system to which the present technology is applied will be described with reference to FIGS. 3A, 3B, 4A, 4B, 5A, 5B, 6A, 6B, 7A and FIG. 7B.

Figure 3:
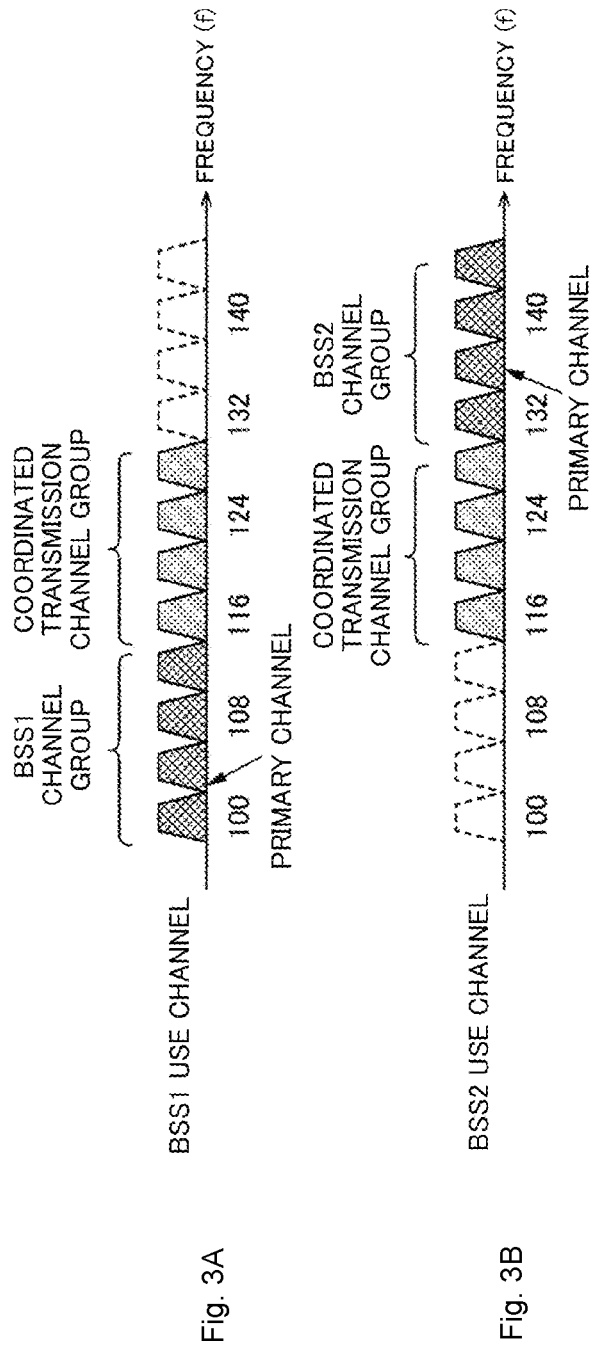
FIGS. 3A and 3B are diagrams showing a first example of setting a channel group in a wireless communication system.

(First example) FIGS. 3A and 3B shows a first example of setting a channel group in a wireless communication system 1.

In FIGS. 3A and 3B, the upper part shows a frequency channel used by the basic service set BSS1 (BSS1 use channel) (FIG. 3A) and the lower part shows a frequency channel used by the basic service set BSS2 (BSS2 use channel) (FIG. 3B).

In FIG. 3A, a BSS1 channel group (100, 104, 108, and 112) used for communication in the network of BSS1 is represented in a grid pattern, and a coordinated transmission channel group (116, 120, 124, and 128) used at the time of performing coordinated transmission is represented in a dot pattern in the BSS1 use channel.

In this BSS1 use channel, channel 104, for example, is set as a primary channel. The primary channel is a specific frequency channel set for each access point AP. A beacon frame is transmitted on the primary channel.

In FIG. 3A, it is assumed that another channel group (132, 136, 140, and 144) represented by broken lines is used in another wireless network.

On the other hand, in FIG. 3B, a coordinated transmission channel group (116, 120, 124, and 128) used at the time of performing coordinated transmission is represented in a dot pattern and a BSS2 channel group (132, 136, 140, and 144) used for communication in the network of BSS2 is represented in a grid pattern in the BSS2 use channel.

In this BSS2 use channel, channel 136, for example, is set as a primary channel. In FIG. 3B, it is assumed that another channel group (100, 104, 108, and 112) represented by broken lines is used in another wireless network.

Here, according to setting of the channel group of the basic service set BSS1 which already exists, the basic service set BSS2 has the following configuration in order to perform coordinated transmission.

That is, in the basic service set BSS2, the same coordinated transmission channel group is set in order to execute coordinated transmission with the basic service set BSS1, and the BSS2 channel group used for communication in the network of the basic service set BSS2 is set by avoiding setting of the BSS1 channel group used for communication in the network of the basic service set BSS1.

Figure 4:
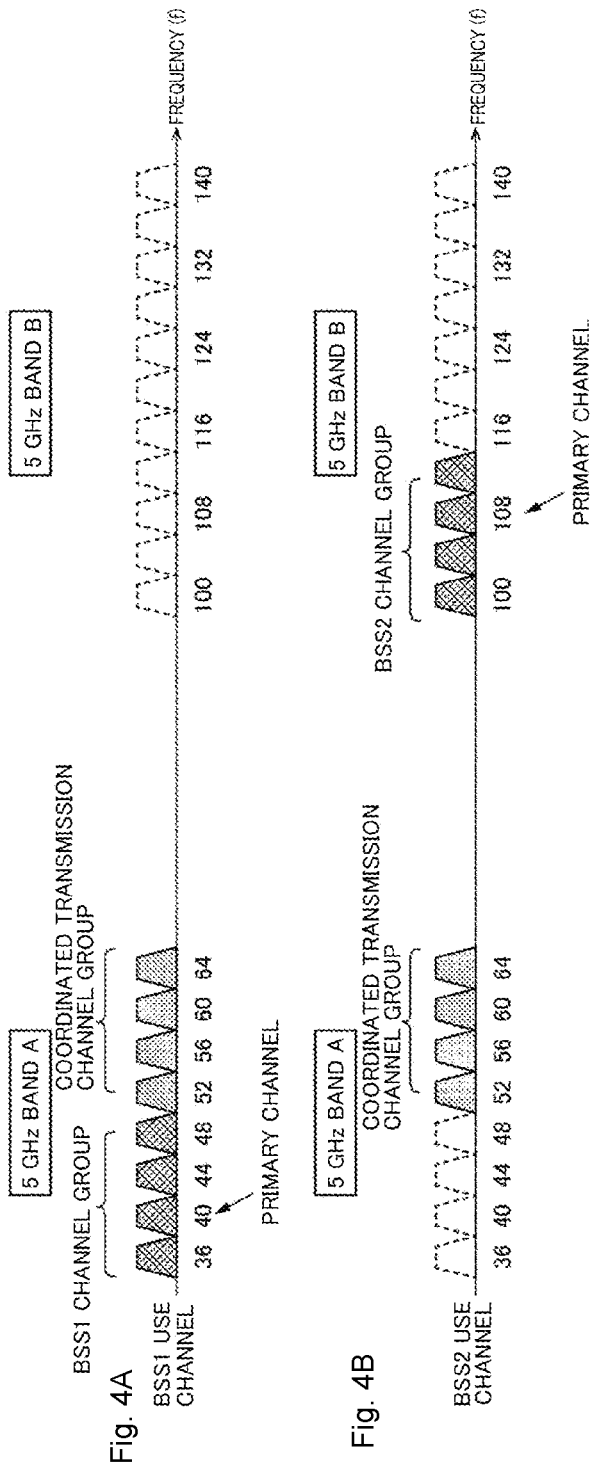
FIGS. 4A and 4B are diagrams showing a second example of setting a channel group in a wireless communication system.

(Second example) FIGS. 4A and 4B shows a second example of setting a channel group in the wireless communication system 1.

FIGS. 4A and 4B shows an example of a case in which 8 channels of a channel group (36, 40, 44, 48, 52, 56, 60, and 64) are available as 5 GHz band A and 11 channels of a channel group (100, 104, 108, 112, 116, 120, 124, 128, 132, 136, and 140) are available as 5 GHz band B in the legal system of a certain country.

In FIG. 4A, a BSS1 channel group (36, 40, 44, and 48) used for communication in the network of BSS1 is represented in a grid pattern, and a coordinated transmission channel group (52, 56, 60, and 64) used at the time of performing coordinated transmission is represented in a dot pattern in a BSS1 use channel.

In this BSS1 use channel, channel 40, for example, is set as a primary channel. In FIG. 4A, only utilization in 5 GHz band A is assumed, and another channel group (100 to 140) of 5 GHz band B represented by the broken lines is assumed to be used in another wireless network.

On the other hand, in FIG. 4B, a coordinated transmission channel group (52, 56, 60, and 64) used at the time of performing coordinated transmission in 5 GHz band A is represented in a dot pattern, and a BSS2 channel group (100, 104, 108, and 112) used for communication in the network of BSS2 in 5 GHz band B is represented a grid pattern in a BSS2 use channel.

In this BSS2 use channel, channel 108, for example, is set as a primary channel.

Although FIG. 4B shows a configuration in which the coordinated transmission channel group (52, 56, 60, and 64) used at the time of performing the existing coordinated transmission is set according to the basic service set BSS1, the other channel group (36, 40, 44, and 48) of 5 GHz band A is set to be used in the basic service set BSS1 and thus utilization of 5 GHz band A cannot be set any more.

Accordingly, the channel group (100, 104, 108, and 112) of 5 GHz band B is set as the BSS2 channel group used for communication in the network of the basic service set BSS2 here.

Further, in FIG. 4B, it is assumed that another channel group (116 to 140) in 5 GHz band B represented by broken lines is used in another wireless network.

In this manner, a basic service set BSS is configured to set a BSS channel group thereof used for communication in the network thereof while avoiding a frequency channel used in another basic service set OBSS adjacent thereto.

Figure 5:
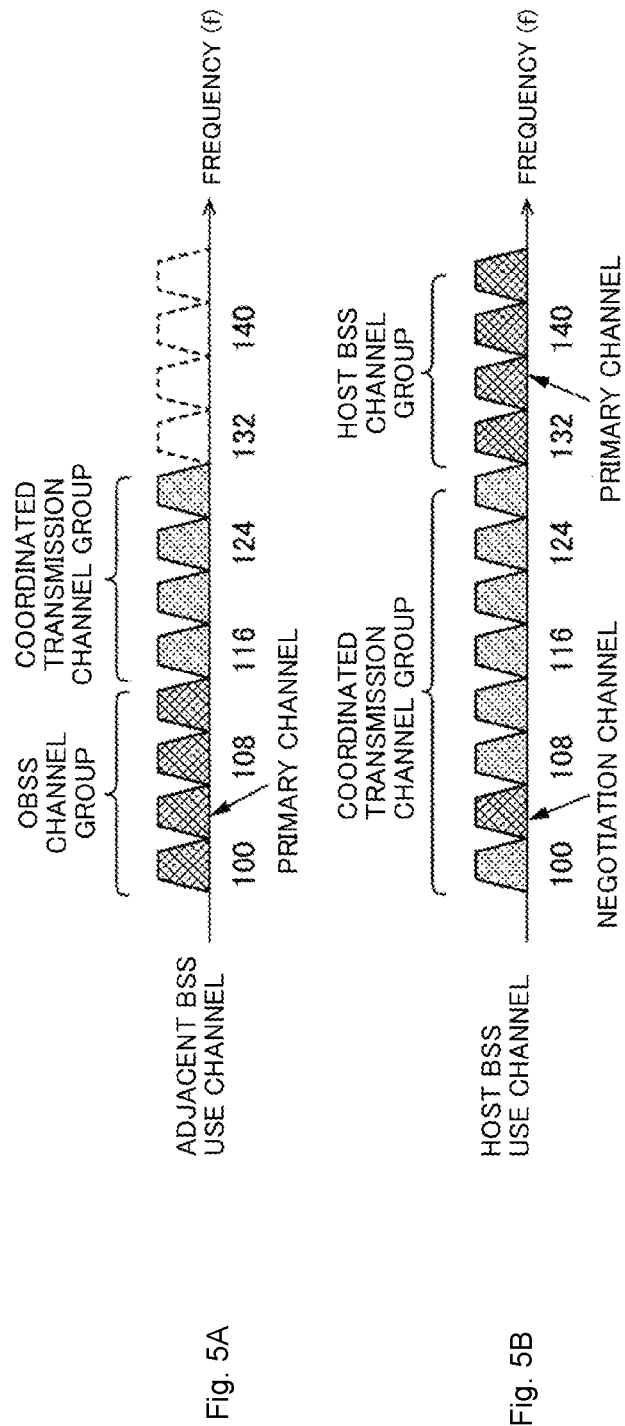
FIGS. 5A and 5B are diagrams showing a third example of setting a channel group in a wireless communication system.

(Third example) FIGS. 5A and 5B shows a third example of setting a channel group in the wireless communication system 1.

FIGS. 5A and 5B shows an example of setting a channel group at the time of setup for performing coordinated transmission in a configuration having the same channel groups as those of the above-described first example of FIGS. 3A and 3B when the basic service set BSS1 and the basic service set BSS2 are present such that they partially overlap.

This example shows a case in which, when the access point AP2 of the basic service set BSS2 performs coordinated transmission to the station STA20, the access point AP1 also performs coordinated transmission.

That is, the basic service set BSS2 sets the basic service set BSS1 as an adjacent BSS for coordinated transmission when the coordinated transmission is set up for the basic service set BSS1.

Further, the basic service set BSS2 dynamically sets a coordinated transmission channel group of the basic service set BSS2 (host BSS) such that it includes a primary channel (channel 104) of the adjacent basic service set BSS1 (adjacent BSS).

Accordingly, a coordinated transmission channel group (FIG. 5B) represented in a dot pattern is extended from 4 channels (116, 120, 124, and 128) to 8 channels (100, 104, 108, 112, 116, 120, 124, and 128) such that it includes 4 channels of an OBSS channel group (FIG. 5A) and setup is performed in the primary channel (channel 104) of the basic service set BSS1.

At the time of setup of coordinated transmission, in the host BSS use channel (FIG. 5B), the frequency channel (channel 104) corresponding to the primary channel of the adjacent BSS use channel (FIG. 5A) serves as a negotiation channel.

At this time, since the host BSS channel group (132, 136, 140, and 144) used for communication in the host network is secured in the host BSS use channel, the throughput of the communication does not deteriorate during setup of coordinated transmission.

Figure 6:
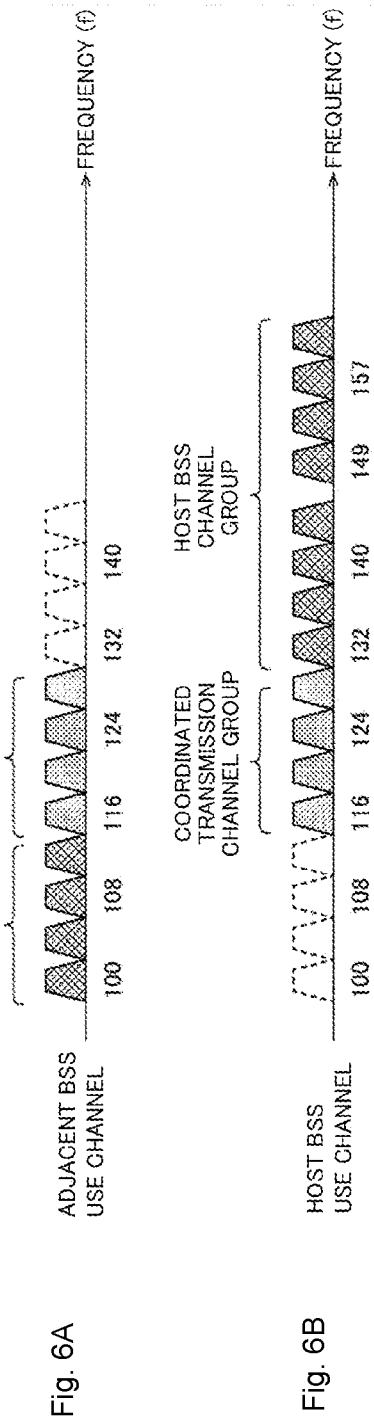
FIGS. 6A and 6B are diagrams showing a fourth example of setting a channel group in a wireless communication system.

(Fourth example) FIGS. 6A and 6B shows a fourth example of setting a channel group in the wireless communication system 1.

FIGS. 6A and 6B shows an example in which the access point AP2 extends a host BSS channel group such that it does not include a coordinated transmission channel group in response to an increase in communication demand (for example, the amount of data) of the host network in a configuration having the same channel groups as those of the above-described first example of FIGS. 3A and 3B when the basic service set BSS1 and the basic service set BSS2 are present such that they partially overlap.

That is, the basic service set BSS2 extends the host BSS channel group (FIG. 6B), avoiding an OBSS channel group (100, 104, 108, and 112) used in the adjacent basic service set BSS1, while retaining a coordinated transmission channel group (116, 120, 124, and 128) represented in a dot pattern.

Accordingly, in the host BSS use channel, the host BSS channel group used for communication in the host network, represented in a grid pattern, can be dynamically extended from 4 channels (132, 136, 140, and 144) to 8 channels (132, 136, 140, 144, 149, 153, 157, and 161). That is, in the host BSS use channel, the host BSS channel group is extended using frequency channels other than the coordinated transmission channel group and the OBSS channel group.

In this manner, a basic service set BSS has a configuration in which the host BSS channel group used for communication in the host network is extended, avoiding a coordinated transmission channel group used at the time of performing coordinated transmission and an OBSS channel group used in another adjacent basic service set BSS. When communication demand in the host network decreases, it is possible to terminate use of the extended frequency band and reduce the host BSS channel group.

Figure 7:
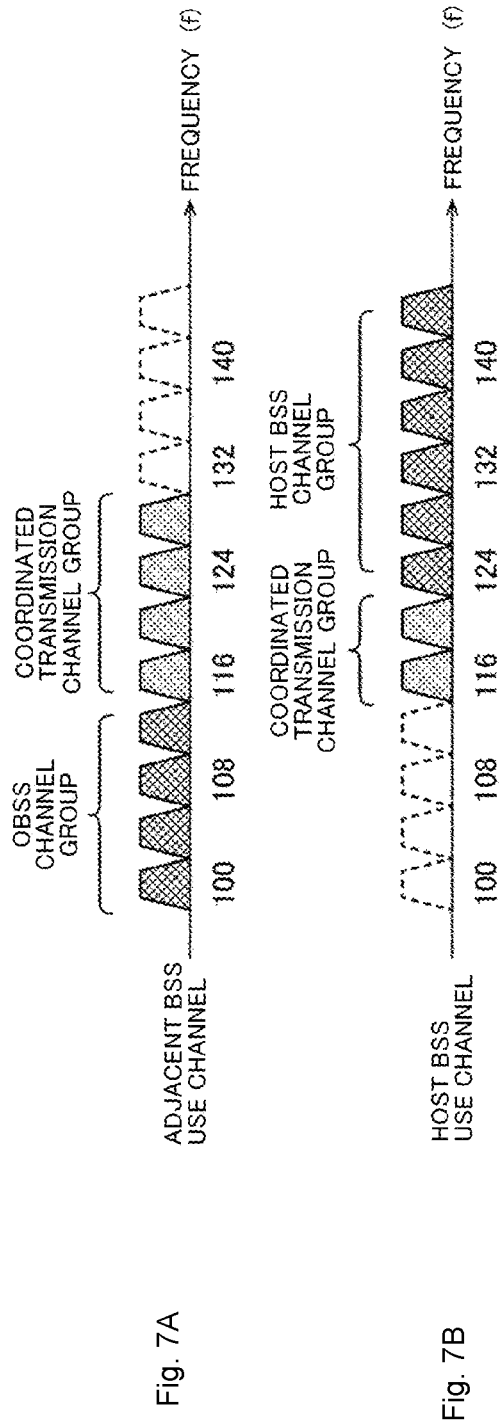
FIGS. 7A and 7B are diagrams showing a fifth example of setting a channel group in a wireless communication system.

(Fifth example) FIGS. 7A and 7B shows a fifth example of setting a channel group in the wireless communication system 1.

FIGS. 7A and 7B shows an example in which the access point AP2 temporarily uses some channels of a coordinated transmission channel group when communication demand (for example, the amount of data) in the host network has increased but a channel group to be used cannot be extended to an unused channel group in a configuration having the same channel groups as those of the above-described first example of FIGS. 3A and 3B when the basic service set BSS1 and the basic service set BSS2 are present such that they partially overlap That is, the basic service set BSS2 temporarily dynamically extends a host BSS channel group used for communication in the host network, represented in a grid pattern, using a group of some channels (124 and 128) in a coordinated transmission channel group (116, 120, 124, and 128)

represented in a dot pattern, avoiding an OBSS channel group (100, 104, 108, and 112) used in the adjacent basic service set BSS1 (FIG. 7B).

Accordingly, in the host BSS use channel, the host BSS channel group used for communication in the host network, represented in a grid pattern, can be dynamically extended from 4 channels (132, 136, 140, and 144) to 6 channels (124, 128, 132, 136, 140, and 144). That is, in the host BSS use channel, the host BSS channel group is temporarily extended using a part of the coordinated transmission channel group.

In this manner, a basic service set BSS has a configuration in which a part of a coordinated transmission channel group used at the time of performing coordinated transmission is temporarily extended as a host BSS channel group used for communication in the host network. When communication demand in the host network decreases, it is possible to terminate use of the extended frequency band and reduce the host BSS channel group.

(Example of Configuration of Communication Device)

Figure 8:
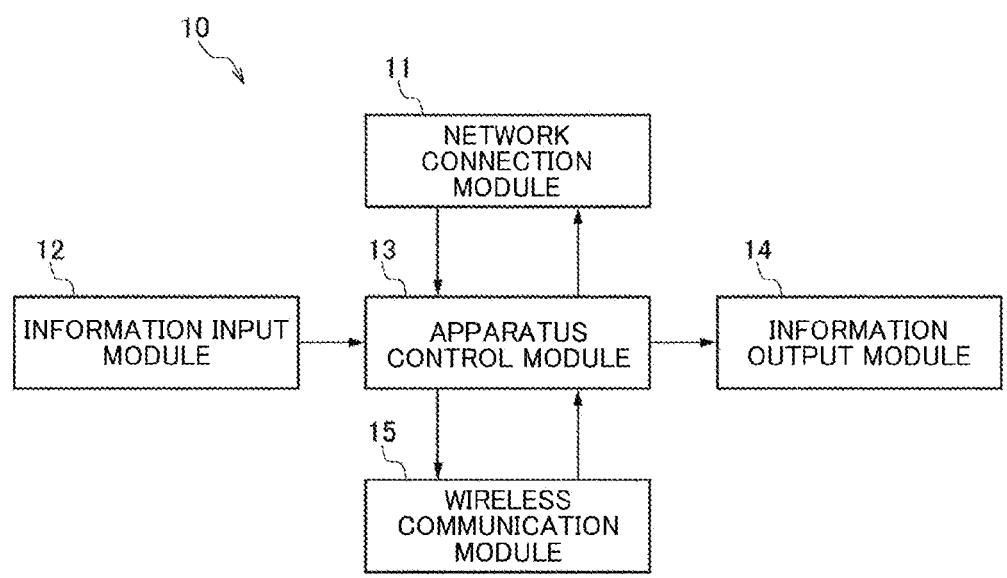
FIG. 8 is a block diagram showing an example of a configuration of a communication device to which the present technology is applied.

FIG. 8 shows an example of a configuration of a communication device to which the present technology is applied.

The communication device 10 shown in FIG. 8 is configured as an access point AP or a station STA in a wireless network (FIG. 1) according to a wireless communication system to which the present technology is applied.

In FIG. 8, the communication device 10 includes a network connection module 11, an information input module 12, an apparatus control module 13, an information output module 14, and a wireless communication module 15.

The network connection module 11 may include, for example, a circuit having a function of connecting to the Internet from an optical fiber network or other communication lines via a service provider, peripheral circuits thereof, a microcontroller, a semiconductor memory, and the like as an access point AP.

The network connection module 11 performs various kinds of processing related to Internet connection according to control of the apparatus control module 13. For example, the network connection module 11 is configured to be equipped with a function such as a communication modem for connecting to the Internet when the communication device 10 operates as an access point AP.

The information input module 12 may include, for example, input devices such as push buttons, a keyboard, and a touch panel. The information input module 12 has a function of inputting instruction information corresponding to an instruction from a user to the apparatus control module 13.

The apparatus control module 13 may include, for example, a microprocessor, a microcontroller, or the like. The apparatus control module 13 controls each unit (module) in order to cause the communication device 10 to operate as an access point AP or a station STA.

The apparatus control module 13 performs various kinds of processing on information supplied from the network connection module 11, the information input module 12, or the wireless communication module 15. Further, the apparatus control module 13 supplies information obtained as a result of processing thereof to the network connection module 11, the information output module 14, or the wireless communication module 15.

For example, the apparatus control module 13 supplies transmission data transferred from an application or the like of a protocol higher layer to the wireless communication module 15 at the time of data transmission, or transfers reception data supplied from the wireless communication module 15 to an application or the like of the protocol higher layer at the time of data reception.

The information output module 14 may be composed of, for example, output devices including a display element such as a liquid crystal display (LCD), an organic EL display (organic light emitting diode (OLED)), or a light emitting diode (LED) display, a speaker that outputs sound and music, and the like.

The information output module 14 has a function of displaying necessary information to the user on the basis of information supplied from the apparatus control module 13. Here, information processed by the information output module 14 may include, for example, an operating state of the communication device 10, information obtained via the Internet, and the like.

The wireless communication module 15 may include, for example, a wireless chip, peripheral circuits, a microcontroller, a semiconductor memory, and the like. The wireless communication module 15 performs various kinds of processing related to wireless communication according to control of the apparatus control module 13. Details of the configuration of the wireless communication module 15 will be described later with reference to FIG. 9.

Although a wireless communication module equipped with a wireless communication chip, peripheral circuits, and the like will be described as an example here, the present technology is not limited to the wireless communication module and can be applied to, for example, a wireless communication chip and a wireless communication LSI circuit. Further, it is optional to include an antenna in the wireless communication module.

Further, although the apparatus control module 13 and the wireless communication module 15 are essential components in the communication device 10 of FIG. 8, it is optional to include the network connection module 11, the information input module 12, and the information output module 14 other than the apparatus control module 13 and the wireless communication module 15 in components.

That is, each communication device 10 that operates as an access point AP or a communication terminal STA can be composed of only necessary modules and thus can be configured such that unnecessary parts are simplified or are not incorporated.

More specifically, for example, the network connection module 11 can be incorporated only in the access point AP, and the information input module 12 and the information output module 14 can be incorporated only in the station STA.

(Example of Configuration of Wireless Communication Module)

Figure 9:
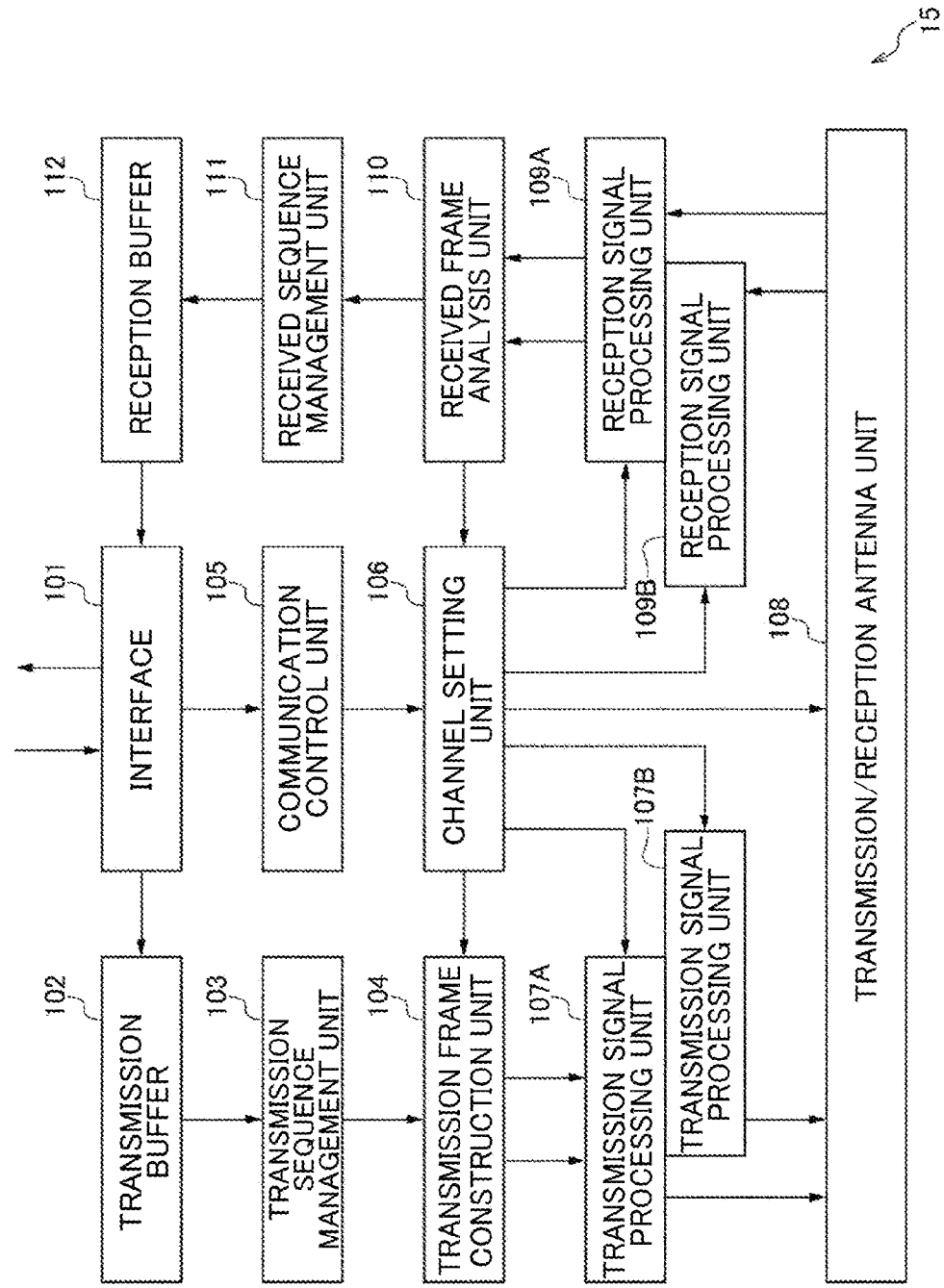
FIG. 9 is a block diagram showing an example of a configuration of a wireless communication module of FIG. 8.

FIG. 9 shows an example of a configuration of the wireless communication module 15 of FIG. 8.

In the wireless communication module 15, an interface 101 for exchanging various types of information and data with the outside, a transmission buffer 102 for temporarily storing transmission data, a transmission sequence management unit 103 for managing a sequence of the transmission data, and a transmission frame construction unit 104 that converts the transmission data into a predetermined frame format are configured as common components of a transmission side.

In contrast to these common components, in a new method, a communication control unit 105 that performs determination of setting of channel groups and management of channel groups corresponding to the new method, a channel setting unit 106 that actually sets transmission and reception of channel groups, and a transmission signal processing unit 107 including a transmission signal processing unit 107A and a transmission signal processing unit 107B are provided.

Here, the transmission signal processing unit 107A is configured to process transmission data (a transmission signal according thereto) of a coordinated transmission channel group, for example, but may have other configurations. Further, the transmission signal processing unit 107B is configured to process transmission data (a transmission signal according thereto) of a host BSS channel group but may have other configurations.

Further, a transmission/reception antenna unit 108 that controls an antenna for transmitting a transmission signal or receiving a reception signal, and a reception signal processing unit 109 including a reception signal processing unit 109A and a reception signal processing unit 109B are provided in the new method.

Here, the reception signal processing unit 109A is configured to process received data (a received signal according thereto) of the coordinated transmission channel group but may have other configurations. Further, the reception signal processing unit 109B is configured to process received data (a received signal according thereto) of the host BSS channel group, for example, but may have other configurations.

In the wireless communication module 15, a received frame analysis unit 110 that extracts necessary data, a received sequence management unit 111 that manages a sequence of received data, and a reception buffer 112 that temporarily stores the received data are configured as common components of a reception side.

In FIG. 9, arrows between blocks represent a flow and control of data (signals), and each block operates in cooperation with other blocks connected by arrows in order to realize a function thereof.

That is, for example, the channel setting unit 106 operates in cooperation with the transmission frame construction unit 104, the transmission signal processing unit 107A, the transmission signal processing unit 107B, the transmission/reception antenna unit 108, the reception signal processing unit 109A, the reception signal processing unit 109B, and the received frame analysis unit 110 according to control of the communication control unit 105 in order to realize a function corresponding to the new method (for example, a function related to setting of transmission or reception of a channel group).

In the wireless communication module 15 configured as described above, in particular, the communication control unit 105 controls the channel setting unit 106 to perform, for example, the following processing.

That is, in the wireless communication module 15 of the communication device 10 (for example, access point AP1), the communication control unit 105 sets a first frequency channel group (e.g., a coordinated transmission channel group) used at the time of simultaneous transmission of data in cooperation with another communication device (e.g., access point AP2) constituting another network (for example, basic service set BSS2) (coordinated transmission), sets a second frequency channel group (for example, a BSS1 channel group) used for communication in a host network (e.g., a basic service set BSS1), and dynamically control the bandwidths of frequency bands in the first frequency channel group (e.g., the coordinated transmission channel group) and the second frequency channel group (e.g., BSS1 channel group).

Further, the communication control unit 105 acquires channel group information (e.g., dynamically used channel group information) including information on the setting state of the first frequency channel group (e.g., information on the coordinated transmission channel group) in the other network (e.g., basic service set BSS2), transmitted from the other communication device (e.g., access point AP2), and sets the first frequency channel group (e.g., coordinated transmission channel group) in the host network (e.g., basic service set BSS1) and the second frequency channel group (e.g., the BSS1 channel group) on the basis of the acquired channel group information.

Further, the channel group information can further include information on a frequency band used for communication in the other network (e.g., basic service set BSS2) (e.g., information on a BSS2 channel group).

(First Example of Dynamic Channel Setting Sequence)

Figure 10:
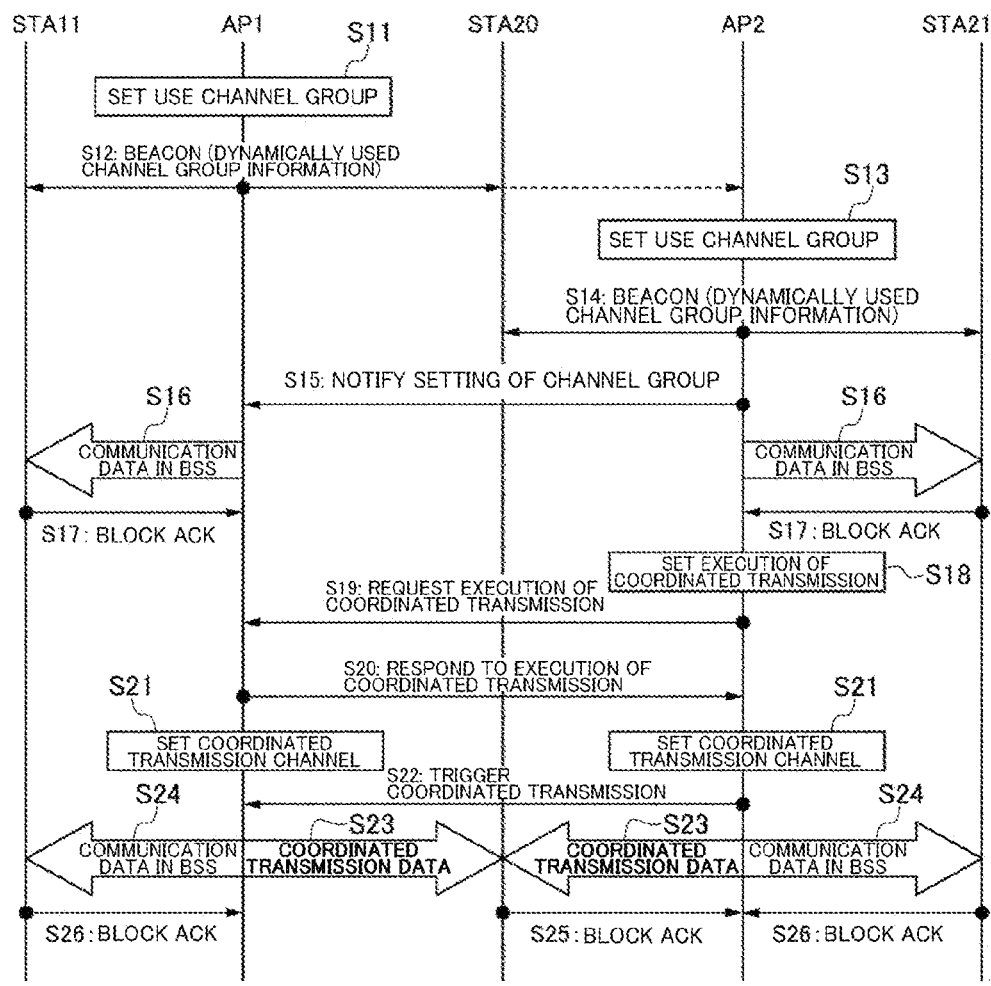
FIG. 10 is a diagram showing a first example of a dynamic channel setting sequence.

FIG. 10 shows a first example of a dynamic channel setting sequence to which the present technology is applied.

FIG. 10 shows a flow of a sequence when the components of the wireless network shown in FIG. 1, that is, the access point AP1 and the station STA11 constituting the basic service set BSS1 and the access point AP2 and the stations STA20 and STA21 constituting the basic service set BSS2, are present. FIG. 10 shows a state of transition from top to bottom in the figure with the passage of time.

In FIG. 10, first, the access point AP1 sets a channel group used in the basic service set BSS1 (S11).

Then, the access point AP1 give a notification of a beacon frame including dynamically used channel group information regarding information on the set channel group (S12). This beacon frame is received by the station STA11 and the station STA20.

On the other hand, the access point AP2 can receive the beacon frame notified by the access point AP1 by scanning a primary channel of the access point AP1, for example, and acquire the dynamically used channel group information included in the beacon frame, for example.

The access point AP2 ascertains a coordinated transmission channel group and a BSS1 channel group on the basis of the acquired dynamically used channel group information and sets a channel group to be used in the basic service set BSS2 (S13). Accordingly, a BSS2 channel group is set in the basic service set BSS2.

Then, the access point AP2 give a notification of a beacon frame including dynamically used channel group information regarding information on the set channel group (S14). This beacon frame is received by the station STA20 and the station STA21.

Further, since the information on the channel group set in the basic service set BSS2 is transmitted only through the primary channel of the basic service set BSS2, the access point AP2 may notify the access point AP1 that the channel group has been set using the primary channel of the basic service set BSS1 as necessary (S15).

At this time, the basic service set BSS2 operates as a basic service set BSS adjacent to the basic service set BSS1.

Accordingly, in the basic service set BSS1, data communication in the basic service set BSS can be performed from the access point AP1 to the station STA11 using the BSS1 channel group (S16). After the data communication, a block ACK frame may be returned from the station STA11 to the access point AP1 as necessary (S17).

Further, in the basic service set BSS2, data communication in the basic service set BSS can be performed from the access point AP2 to the station STA21 using the BSS2 channel group (S16). After the data communication, a block ACK frame may be returned as necessary (S17).

Here, when data is transmitted from the access point AP2 of the basic service set BSS2 to the station STA20, the access point AP2 sets execution of coordinated transmission upon determining that coordinated transmission with the access point AP1 of the basic service set BSS1 will be performed (S18).

Then, the access point AP2 gives a notification of a coordinated transmission execution request frame using the primary channel of the basic service set BSS1 (S19).

The access point AP1 of the basic service set BSS1, which has received the coordinated transmission execution request frame, gives a notification of a coordinated transmission execution response frame when coordinated transmission can be performed (S20).

Accordingly, a common coordinated transmission channel group is set in the basic service set BSS1 and the basic service set BSS2 (S21).

Here, a coordinated transmission trigger frame is transmitted from the access point AP2 of the basic service set BSS2 (S22), and in response to this, coordinated transmission data is transmitted from the access point AP1 and the access point AP2 to the station STA20 (S23). Accordingly, coordinated transmission is performed.

By using the communication channel groups (BSS1 channel group and BSS2 channel group) in the host basic service set BSS separately from the coordinated transmission channel group, the access point AP1 can transmit data to the station STA11 and the access point AP2 can transmit data to the station STA21 (S24).

At this time, since the BSS1 channel group and the BSS2 channel group are different from the coordinated transmission channel group, it is possible to curb deterioration of the throughput at the time of performing communication in the host basic service set BSS according to execution of coordinated transmission. On the contrary, even if communication in the host basic service set BSS is performed, the throughput at the time of performing coordinated transmission does not deteriorate.

Further, after data communication, block ACK frames may be returned from the stations STA to the access points AP as necessary (S25 and S26). At this time, the uplink multi-user multiplex transmission technique may be applied as a method for simultaneously returning the ACK frames.

(Second Example of Dynamic Channel Setting Sequence)

Figure 11:
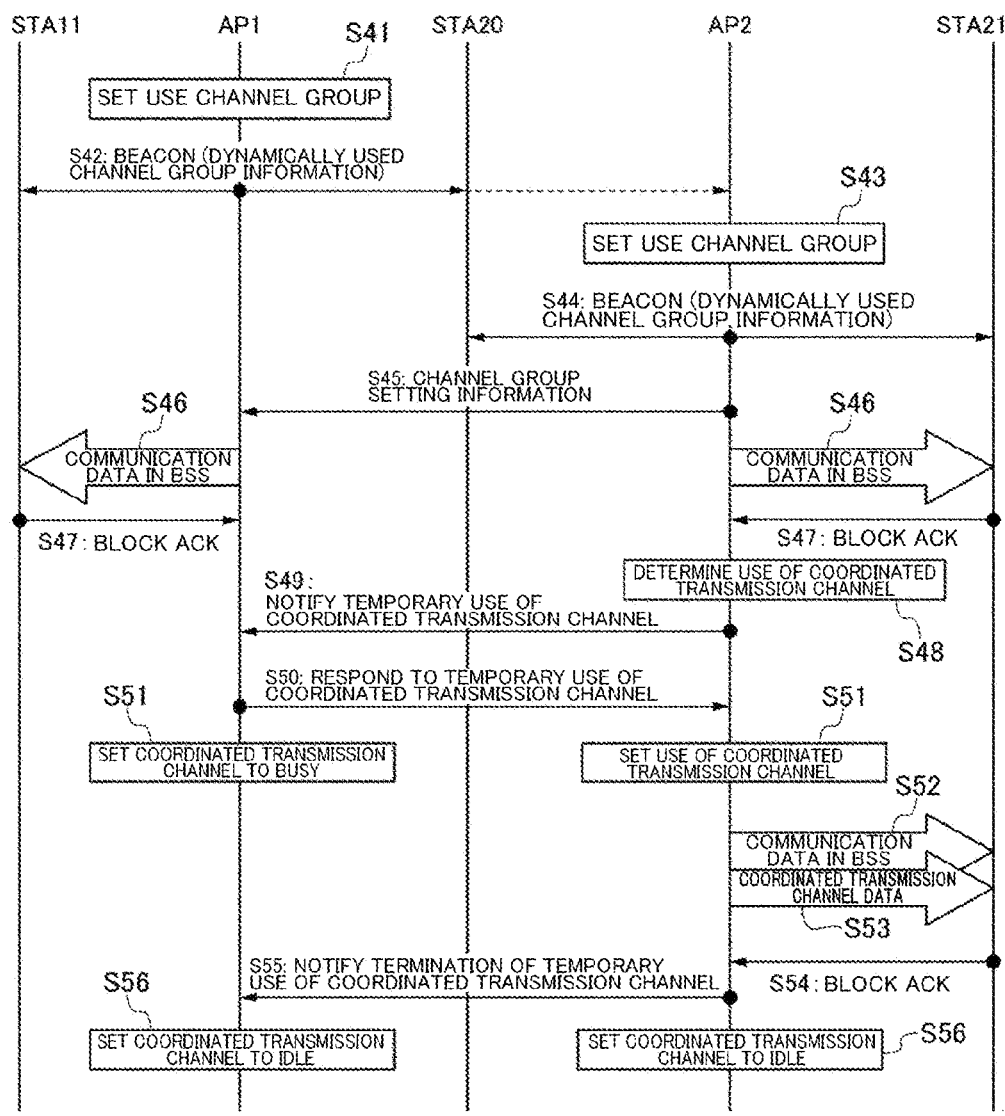
FIG. 11 shows a second example of a dynamic channel setting sequence.

FIG. 11 shows a second example of a dynamic channel setting sequence to which the present technology is applied.

FIG. 11 shows a flow of dynamic channel setting in the wireless network shown in FIG. 1 similar to the above-described sequence of FIG. 10.

In steps S41 to S47, the access points AP1 and AP2 set BSS channel groups (BSS1 channel group and BSS2 channel group) used in the respective basic service sets BSS and give a notification of beacon frames including dynamically used channel group information to perform data communication in the basic service sets BSS as in steps S11 to S17 of FIG. 10.

Here, when a demand for data transmission (for example, the amount of data) from the access point AP2 of the basic service set BSS2 to the station STA21 increases, the access point AP2 determines that a coordinated transmission channel group is temporarily used (S48).

Then, the access point AP2 give a notification of a coordinated transmission channel temporary use notification frame (S49) using the primary channel of the basic service set BSS1. Here, although all of the coordinated transmission channel group may be used, it is possible to set channels such that a minimum number of required frequency channels is temporarily used without using all of the coordinated transmission channel group.

The access point AP1 of the basic service set BSS1, which has received the coordinated transmission channel temporary use notification frame, gives a notification of a coordinated transmission channel temporary use response frame when the coordinated transmission channel group can be temporarily used (S50).

Further, the access point AP1 sets that the coordinated transmission channel group is temporarily in a busy state (S51). On the other hand, the access point AP2 of the basic service set BSS2, which has received the coordinated transmission channel temporary use response frame, sets temporary use of the coordinated transmission channel group (S51).

Accordingly, upon ascertaining temporary use of the coordinated transmission channel group by the basic service set BSS1, the basic service set BSS2 can perform data transmission using the BSS2 channel group and the coordinated transmission channel group (some frequency channels thereof) together for data communication in the host basic service set BSS (S52 and S53). After data communication, a block ACK frame may be returned as necessary (S54).

Then, when a demand for data transmission (for example, the amount of data) from the access point AP2 of the basic service set BSS2 to the station STA21 decreases, the access point AP2 give a notification of a coordinated transmission channel temporary use end frame using the primary channel of the basic service set BSS1 (S55).

The access point AP1 of the basic service set BSS1, which has received the coordinated transmission channel temporary use end frame, ascertains that temporary use of the coordinated transmission channel group in the basic service set BSS2 has ended and sets that the coordinated transmission channel group is in an idle state (S56). Likewise, the access point AP2 also sets that the coordinated transmission channel group is in the idle state (S56).

(Example of Configuration of BSS Use Channel Group Information Element)

FIG. 12 shows an example of a configuration of a BSS use channel group information element.

This BSS use channel group information element is mainly included in a beacon frame and a probe response frame as dynamically used channel group information (setting information). The BSS use channel group information element is used to notify a communication device of a basic service set BSS to which a host belongs of setting of a channel group to be used.

In FIG. 12, the BSS use channel group information element includes Element ID, Length, Capability, Operation Type, Primary Channel, Coordinate Operation Channel Bitmaps, BSS Operation Channel Bitmaps, and the like.

Element ID includes an ID that identifies the element. Length includes the information length of the BSS use channel group information. Capability includes information indicating the capability of an access point AP.

Operation Type includes information indicating a current operation format of the access point AP. Primary Channel includes information indicating a primary channel of a target basic service set BSS.

Coordinate Operation Channel Bitmaps include information indicating a coordinated transmission channel group in a bitmap format. BSS Operation Channel Bitmaps include information indicating a BSS channel group used for communication in the network of the target basic service set BSS in a bitmap format.

The information indicating the coordinated transmission channel group and the BSS channel group is not limited to the bitmap format and may be arranged using another format.

(Example of Configuration of Operation Channel Group Setting Notification Frame)

FIG. 13 shows an example of a configuration of an operation channel group setting notification frame.

The operation channel group setting notification frame is prepared for a newly operating access point AP to perform transmission to a neighboring access point APs that enables coordinated transmission.

In FIG. 13, the operation channel group setting notification frame includes Frame Control, Duration, Transmit Address, Receive Address, Operation Type, Primary Channel, Coordinate Operation Channel Bitmaps, BSS Operation Channel Bitmaps, and the like.

Frame Control includes information indicating a frame format. Duration includes information indicating a duration of the frame. Transmit Address includes information indicating a transmission address. Receive Address includes information indicating a reception address.

Operation Type includes information indicating a current operation format of an access point AP.

This Operation Type field includes Coordinate Tx Owner that identifies a communication device that sets coordinated transmission, Coordinate Tx Slave that identifies a communication device that performs coordinated transmission subordinately, Temporary Use that identifies exchange of a temporarily used frame, Trigger Tx Available that identifies execution of transmission of a coordinated transmission trigger frame, and the like.

Although it is desirable that Coordinate Tx Owner set transmission of the coordinated transmission trigger frame, a case in which the coordinated transmission trigger frame is transmitted from the communication device that performs coordinated transmission subordinately is also conceived according to circumstances. In such a case, that is, when Coordinate Tx Owner does not set Trigger Tx Available, Coordinate Tx Slave may set Trigger Tx Available.

In the configuration of the operation channel group setting notification frame, "0" is set to both Coordinate Tx Owner and Coordinate Tx Slave and "0" is also set to Temporary Use in the Operation Type field because coordinated transmission is not set.

Primary Channel includes information indicating a primary channel of a target basic service set BSS. Coordinate Operation Channel Bitmaps include information indicating a coordinated transmission channel group. BSS Operation Channel Bitmaps include information indicating a BSS channel group.

Parameters shown in FIG. 13 are exemplary and a configuration in which various parameters are notified as necessary may be employed, and a space for future extension is prepared as Reserved. Further, the Operation Type field included in an information element of a beacon frame may also include the same information as the Operation Type field shown in FIG. 13.

(Example of Configuration of Coordinated Transmission Execution Request Frame)

FIG. 14 shows an example of a configuration of a coordinated transmission execution request frame.

The coordinated transmission execution request frame is used for an access point AP (for example, AP2) that sets coordinated transmission to notify an access point AP (for example, AP1) that responds to setting of the coordinated transmission of coordinated transmission parameters when the coordinated transmission is performed.

In FIG. 14, the coordinated transmission execution request frame includes Frame Control, Duration, Transmit Address, Receive Address, Operation Type, Target STA Address, Request Bandwidth, Coordinate Operation Channel Bitmaps, and the like.

Frame Control includes information indicating a frame format. Duration includes information indicating a duration of the frame. Transmit Address includes information indicating a transmission address. Receive Address includes information indicating a reception address.

Operation Type includes information indicating a current operation format of an access point AP. The Operation Type field includes Coordinate Tx Owner, Coordinate Tx Slave, Temporary Use, Trigger Tx Available, and the like.

In the configuration of the coordinated transmission execution request frame, Coordinate Tx Owner is set to "1", Coordinate Tx Slave is set to "0", and Temporary Use is set to "0" in the Operation Type field because coordinated transmission is set.

In addition, Trigger Tx Available is set to "1" when a host is in a state of transmitting the coordinated transmission trigger frame, but when the host requests the other party to transmit the coordinated transmission trigger frame, Trigger Tx Available is set to "0".

Target STA Address includes information that identifies a communication device that is a target of coordinated transmission. Request Bandwidth includes information indicating a bandwidth of a requested frequency channel. Coordinate Operation Channel Bitmaps include information indicating a coordinated transmission channel group.

(Example of Configuration of Coordinated Transmission Execution Response Frame)

FIG. 15 shows an example of a configuration of a coordinated transmission execution response frame.

The coordinated transmission execution response frame is used for an access point AP (for example, AP1) that responds to setting of coordinated transmission to notify an access point AP (for example, AP2) that sets the coordinated transmission of coordinated transmission parameters when the coordinated transmission is performed.

In FIG. 15, the coordinated transmission execution response frame includes Frame Control, Duration, Transmit Address, Receive Address, Operation Type, Target STA Address, Grant Bandwidth, Coordinate Operation Channel Bitmaps, and the like.

Frame Control includes information indicating a frame format. Duration includes information indicating a duration of the frame. Transmit Address includes information indicating a transmission address. Receive Address includes information indicating a reception address.

Operation Type includes information indicating a current operation format of an access point AP. The Operation Type field includes Coordinate Tx Owner, Coordinate Tx Slave, Temporary Use, Trigger Tx Available, and the like.

In the configuration of the coordinated transmission execution response frame, the Operation Type field is configured to perform coordinated transmission subordinately, and thus Coordinate Tx Owner is set to "0" and Coordinate Tx Slave is set to "1", and Temporary Use is set to "0".

In addition, Trigger Tx Available is set to "0" when the requesting party is in a state of transmitting the coordinated transmission trigger frame, but when the requesting party requests transmission of the coordinated transmission trigger frame and accepts it, the coordinated transmission trigger frame is transmitted from the host by setting Trigger Tx Available to "1".

Target STA Address includes information that identifies a communication device that is a target of coordinated transmission. Grant Bandwidth includes information indicating a bandwidth of a frequency channel to be granted. Coordinate Operation Channel Bitmaps include information indicating a coordinated transmission channel group.

(Example of Configuration of Coordinated Transmission Channel Temporary Use Notification Frame)

FIG. 16 shows an example of a configuration of a coordinated transmission channel temporary use notification frame.

The coordinated transmission channel temporary use notification frame is used for an access point AP (for example, AP2) that temporarily uses a coordinated transmission channel group to notify a neighboring access point AP (for example, AP1) that sets the coordinated transmission channel group of a coordinated transmission channel group temporary use parameter when the coordinated transmission channel group (some frequency channels thereof) is temporarily used.

In FIG. 16, the coordinated transmission channel temporary use notification frame includes Frame Control, Duration, Transmit Address, Receive Address, Operation Type, Target STA Address, Request Bandwidth, Coordinate Operation Channel Bitmaps, and the like.

Frame Control includes information indicating a frame format. Duration includes information indicating a duration of the frame. Transmit Address includes information indicating a transmission address. Receive Address includes information indicating a reception address.

Operation Type includes information indicating a current operation format of an access point AP. The Operation Type field includes Coordinate Tx Owner, Coordinate Tx Slave, Temporary Use, Trigger Tx Available, and the like.

In the configuration of the coordinated transmission channel temporary use notification frame, Coordinate Tx Owner is set to "1" and Coordinate Tx Slave is set to "0" in the Operation Type field because use of coordinated transmission channel group is set, and Temporary Use is set to "1" because the coordinated transmission channel group is temporarily used.

Target STA Address includes information that identifies a communication device that is a target of temporary use. Request Bandwidth includes information indicating a bandwidth of a requested frequency channel. Coordinate Operation Channel Bitmaps include information indicating a coordinated transmission channel group.

(Example of Configuration of Coordinated Transmission Channel Temporary Use Response Frame)

FIG. 17 shows an example of a configuration of a coordinated transmission channel temporary use response frame.

The coordinated transmission channel temporary use response frame is used for an access point AP (for example, AP1) that responds to use of a coordinated transmission channel group to notify an access point AP (for example, AP2) that temporarily uses coordinated transmission channels of coordinated transmission parameters when a part of the coordinated transmission channel group is temporarily used.

In FIG. 17, the coordinated transmission channel temporary use response frame includes Frame Control, Duration, Transmit Address, Receive Address, Operation Type, Target STA Address, Grant Bandwidth, Coordinate Operation Channel Bitmaps, and the like.

Frame Control includes information indicating a frame format. Duration includes information indicating a duration of the frame. Transmit Address includes information indicating a transmission address. Receive Address includes information indicating a reception address.

Operation Type includes information indicating a current operation format of an access point AP. The Operation Type field includes Coordinate Tx Owner, Coordinate Tx Slave, Temporary Use, Trigger Tx Available, and the like.

In the configuration of the coordinated transmission channel temporary use response frame, Coordinate Tx Owner is set to "0" and Coordinate Tx Slave is set to "1" in the Operation Type field because use of the coordinated transmission channels is accepted, and Temporary Use is set to "1" because the coordinated transmission channels are temporarily used.

Target STA Address includes information that identifies a communication device that is a target of temporary use. Grant Bandwidth includes information indicating a bandwidth of a frequency channel to be granted. Coordinate Operation Channel Bitmaps include information indicating a coordinated transmission channel group.

(Example of Configuration of Coordinated Transmission Channel Temporary Use End Frame)

FIG. 18 shows an example of a configuration of a coordinated transmission channel temporary use end frame.

The coordinated transmission channel temporary use end frame is used to give a notification of restoring to setting of a previous coordinated transmission channel group after temporary use of a coordinated transmission channel group ends.

In FIG. 18, the coordinated transmission channel temporary use end frame includes Frame Control, Duration, Transmit Address, Receive Address, Operation Type, Primary Channel, Coordinate Operation Channel Bitmaps, BSS Operation Channel Bitmaps, and the like.

Frame Control includes information indicating a frame format. Duration includes information indicating a duration of the frame. Transmit Address includes information indicating a transmission address. Receive Address includes information indicating a reception address.

Operation Type includes information indicating a current operation format of an access point AP. The Operation Type field includes Coordinate Tx Owner, Coordinate Tx Slave, Temporary Use, Trigger Tx Available, and the like.

In the configuration of the coordinated transmission channel temporary use end frame, both Coordinate Tx Owner and Coordinate Tx Slave are set to "0" in the Operation Type field because use of the coordinated transmission channels is restored to the original state, and "1" is set to Temporary Use because temporary use ends.

Primary Channel includes information indicating a primary channel of a target basic service set BSS. Coordinate Operation Channel Bitmaps include information indicating a coordinated transmission channel group. BSS Operation Channel Bitmaps include information indicating a BSS channel group.

Next, details of processing performed by a communication device 10 operating as an access point AP in a wireless communication system to which the present technology is applied will be described with reference to the flowcharts of FIG. 19 to FIG. 23.

(Flow of Channel Group Setting Operation)

Figure 19:
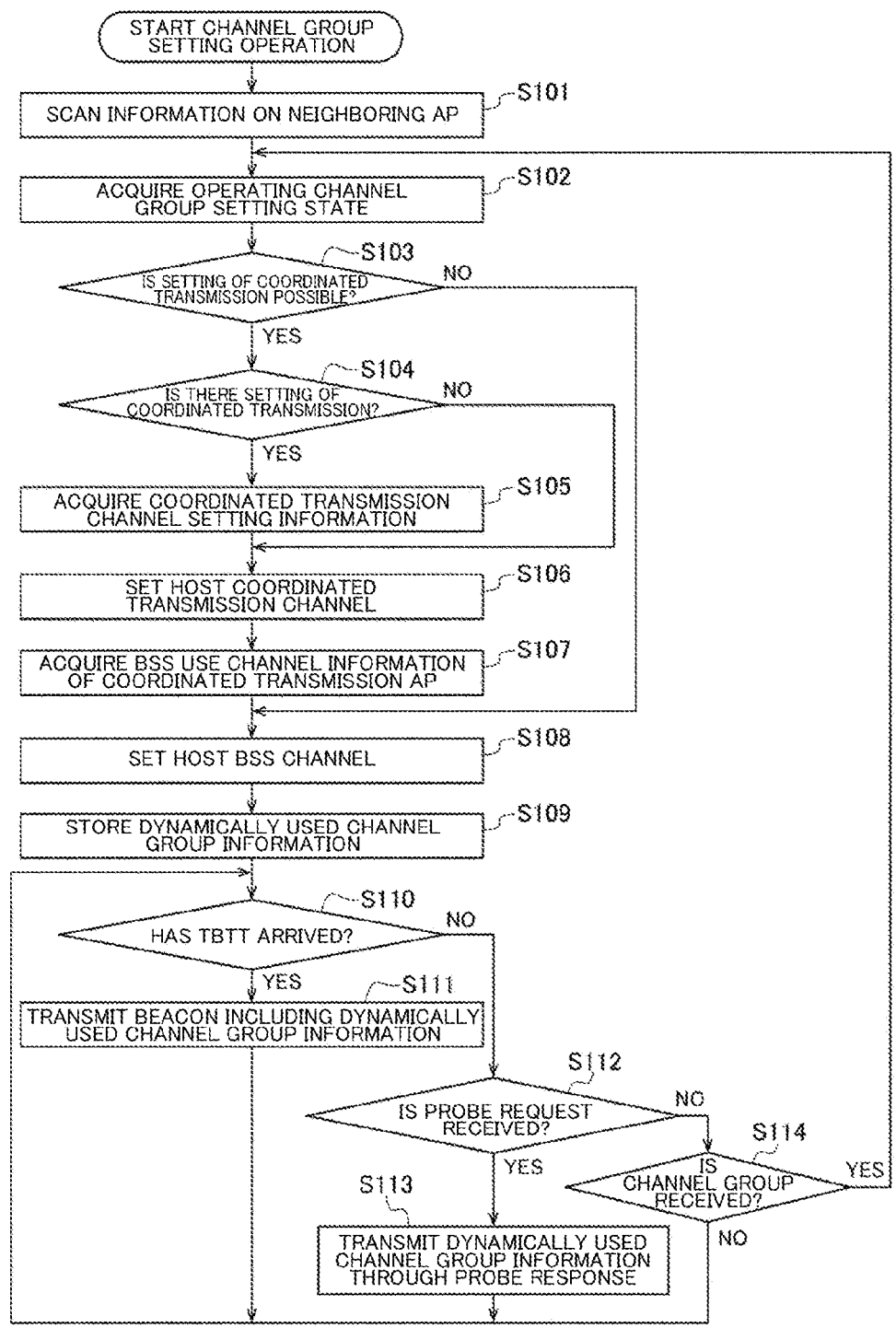

First, a flow of a channel group setting operation will be described with reference to the flowchart of FIG. 19. This channel group setting operation is performed by the wireless communication module 15 of the communication device 10 operating as an access point AP.

First, the wireless communication module 15 performs a scanning operation on each frequency channel in order to ascertain an operating state of a neighboring access point AP (S101) and acquires an operating channel group setting state (S102).

When there is an access point AP capable of setting coordinated transmission ("YES" in S103), if the neighboring access point AP sets a coordinated transmission channel group ("YES" in S104), the wireless communication module 15 acquires coordinated transmission channel group setting information on the basis of the acquired operating channel group setting state (S105).

Then, the wireless communication module 15 sets the coordinated transmission channel group as a coordinated transmission channel group of the host on the basis of the acquired coordinated transmission channel group setting information (S106).

On the other hand, even when there is an access point AP capable of setting coordinated transmission ("YES" in S103), if the neighboring access point AP does not set a coordinated transmission channel group ("NO" in S104), the wireless communication module 15 newly sets a coordinated transmission channel group as a coordinated transmission channel group of the host (S106).

Further, the wireless communication module 15 acquires information on a channel group used for communication in a basic service set BSS of the access point AP capable of setting a coordinated transmission (S107). Then, the wireless communication module 15 sets a host BSS channel group on the basis of the acquired information on the channel group, avoiding overlap with an OBSS channel group of the access point AP (coordinated transmission AP) capable of setting coordinated transmission (S108).

On the other hand, when there is no access point AP capable of setting coordinated transmission ("NO" in S103), the wireless communication module 15 may not set a coordinated transmission channel group at that time and newly sets only a host BSS channel group used for communication in the host basis service set BSS (S108).

Then, the wireless communication module 15 stores information on the set coordinated transmission channel group, information on the host BSS channel group, information on a primary channel of the adjacent access point AP, information on a primary channel of the host, and the like as dynamically used channel group information (S109).

Thereafter, when a target beacon transmission time (TBTT) arrives ("YES" in S110), the wireless communication module 15 transmits a beacon frame including the dynamically used channel group information (information element thereof) (S111).

Further, when a probe request is received from another communication device ("YES" in S112), the wireless communication module 15 transmits a response frame including the dynamically used channel group information as a probe response (S113).

When an operating channel group setting state is received from another access point AP ("YES" in S114), processing returns to step S102 and subsequent processing is repeated. If processing of step S111 or S113 ends or determination processing of step S114 is determined to be negative ("NO"), processing returns to step S110 and subsequent processing is repeated.

(Flow of Coordinated Transmission Setting Operation)

Next, a flow of a coordinated transmission setting operation will be described with reference to the flowcharts of FIG. 20 and FIG. 21. This coordinated transmission setting operation is performed by the wireless communication module 15 of the communication device 10 operating as an access point AP.

The wireless communication module 15 acquires the type of data to be transmitted on the basis of an operating state of a connected communication device or application (S201).

If it is determined that coordinated transmission is necessary on the basis of the acquired transmission type ("YES" in S202), and there is an access point AP capable of coordinated transmission ("YES" in S203), the wireless communication module 15 sets a frequency channel corresponding to a primary channel of the access point AP as a coordinated transmission channel (S204).

Then, when a timing at which transmission can be performed in a predetermined access control procedure has arrived ("YES" in S205), the wireless communication module 15 transmits a coordinated transmission execution request frame using the set coordinated transmission channel (S206).

When a coordinated transmission execution response frame is received as a response frame for the coordinated transmission execution request frame ("YES" in S207), the wireless communication module 15 acquires coordinated transmission parameters included in the coordinated transmission execution response frame (S208).

The wireless communication module 15 sets a coordinated transmission channel group on the basis of the acquired coordinated transmission parameters (S209).

Here, if it is necessary to transmit a coordinated transmission trigger frame ("YES" in S210), the wireless communication module 15 transmits the coordinated transmission trigger frame at a timing corresponding to coordinated transmission (S211) and cooperatively transmit coordinated transmission data (S213).

On the other hand, when the coordinated transmission trigger frame is not transmitted ("NO" in S210), the wireless communication module 15 cooperatively transmits the coordinated transmission data (S213) if the coordinated transmission trigger frame is received from the access point AP (AP of the other party) capable of coordinated transmission ("YES" in S212).

Thereafter, if it is necessary to continue the coordinated transmission ("YES" in S214), processing returns to step S210 and subsequent processing is repeated such that the coordinated transmission continues. On the other hand, if it is not necessary to continue the coordinated transmission ("NO" in S214), processing ends.

If the coordinated transmission trigger frame is not received from the access point AP (AP of the other party) capable of coordinated transmission ("NO" in S212), processing returns to step S210 (or S212) and processing described above is repeated.

Figure 21:
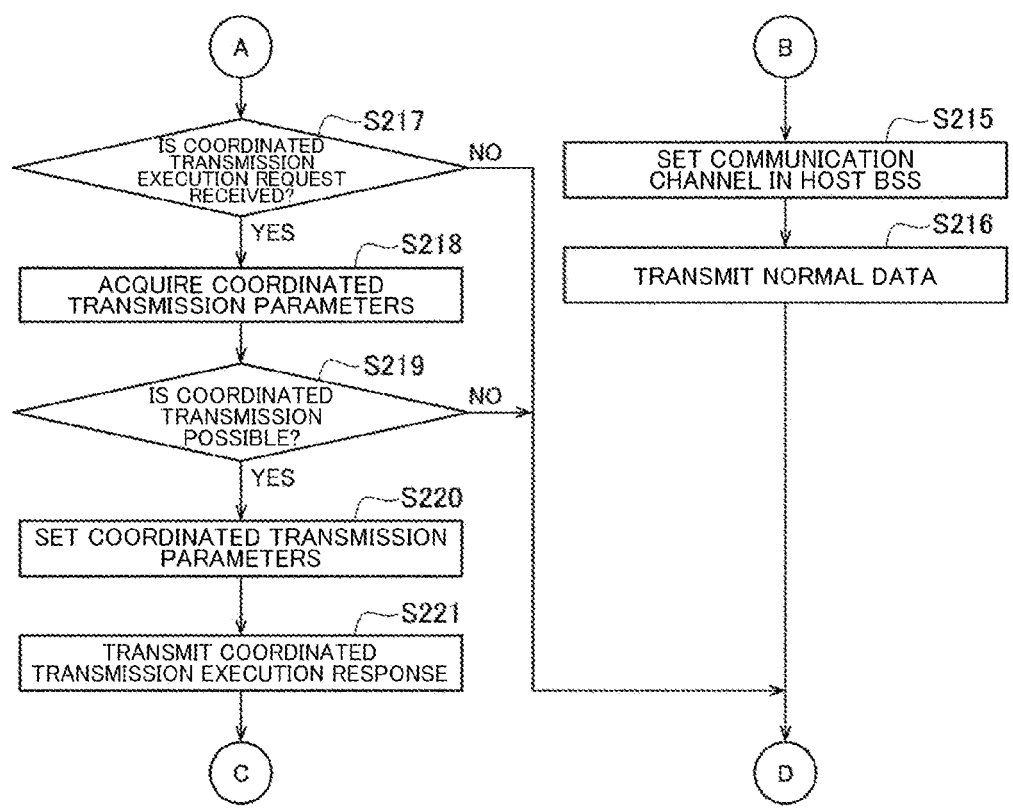

Further, if it is determined in determination processing of step S203 described above that there is no access point AP capable of coordinated transmission ("NO" in S203), processing of steps S215 and S216 of FIG. 21 is performed.

That is, the wireless communication module 15 sets a host BSS channel group used for communication in the host basic service set BSS (S215) and transmits normal data using the set host BSS channel group (S216). Then, when transmission of the normal data ends, processing ends.

Further, if it is determined in determination processing of step S202 described above that coordinated transmission is unnecessary ("NO" in S202), processing of steps S217 to S221 of FIG. 21 is performed.

That is, even when the wireless communication module 15 determines that coordinated transmission is not necessary by its own determination ("NO" in S202), it acquires coordinated transmission parameters included in a coordinated transmission execution request frame (S218) if the coordinated transmission execution request frame is received from the adjacent access point AP ("YES" in S217).

Then, the wireless communication module 15 sets coordinated transmission parameters that it agrees on (S220) if it is determined that coordinated transmission is possible on the basis of the acquired coordinated transmission parameters and the like ("YES" in S219) and transmits a coordinated transmission execution response frame including the coordinated transmission parameters to the adjacent access point AP (S221).

Figure 20:
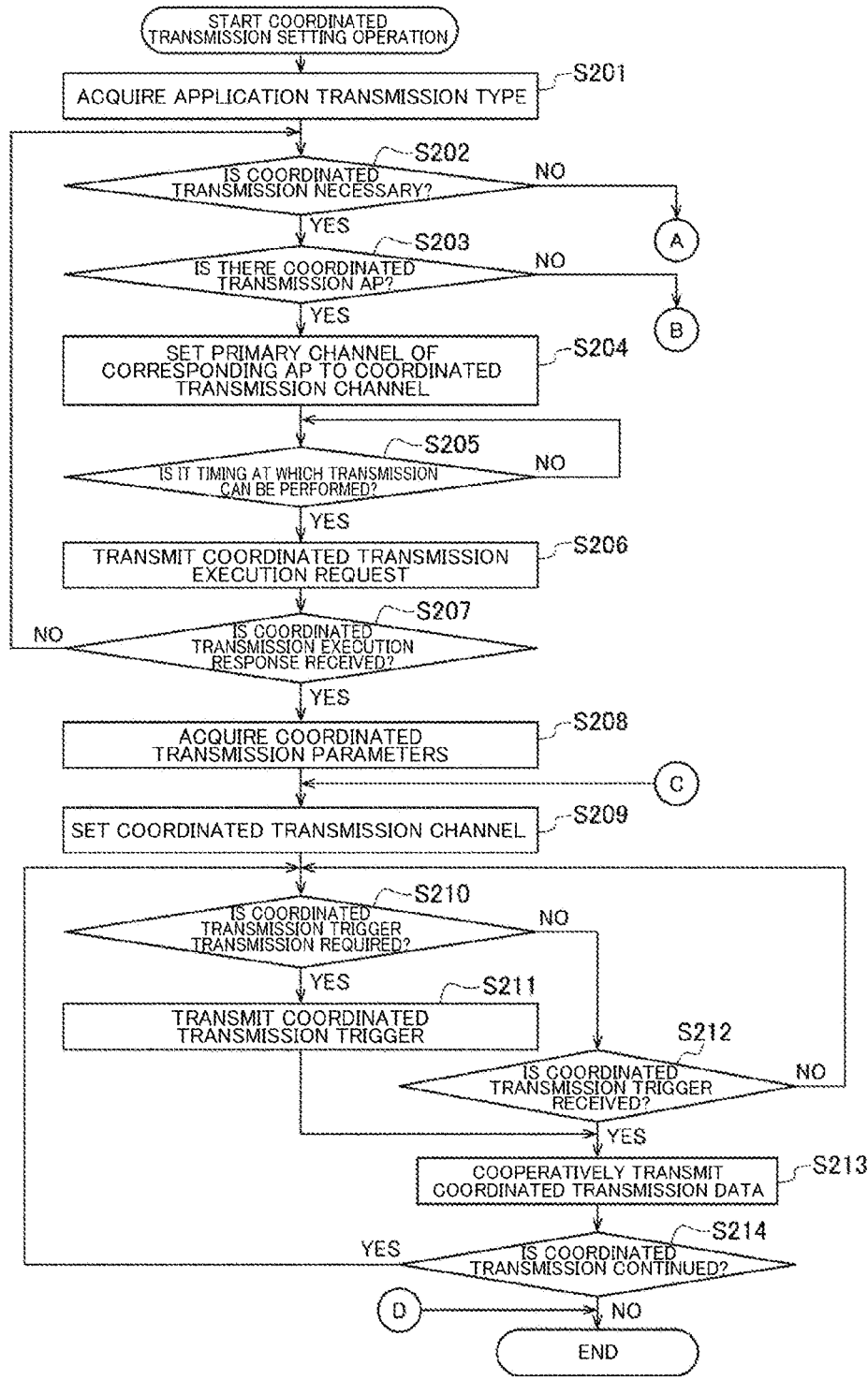

When processing of step S221 ends, processing proceeds to step S209 of FIG. 20 and coordinated transmission using the set coordinated transmission channel group is performed. Processing after step S209 is as described above, and thus description thereof will be omitted here.

If the coordinated transmission execution request frame is not received from the adjacent access point AP ("NO" in S217) or if it is determined that coordinated transmission is impossible ("NO" in S219), processing ends.

(Flow of coordinated transmission channel extension operation) Finally, a flow of a coordinated transmission channel extension operation will be described with reference to the flowcharts of FIG. 22 and FIG. 23. This coordinated transmission channel extension operation is performed by the wireless communication module 15 of the communication device 10 operating as an access point AP.

The wireless communication module 15 acquires the type of data to be transmitted on the basis of an operating state of a connected communication device or application (S301).

The wireless communication module 15 calculates a frequency bandwidth required for the application on the basis of the acquired information such as the transmission type (S302). Further, the wireless communication module 15 acquires a setting state of the existing host BSS channel group (S303).

When the wireless communication module 15 determines that the bandwidth needs to be extended on the basis of the calculated frequency bandwidth and the acquired setting state of the host BSS channel group ("YES" in S304), if the host BSS channel group can be extended using a frequency channel other than the coordinated transmission channel group ("YES" in S305), the wireless communication module 15 sets (adds) the channel (frequency channel other than the coordinated transmission channel group) to the host BSS channel group to extend the bandwidth (S306).

On the other hand, when it is determined that the host BSS channel group cannot be extended using a frequency channel other than the coordinated transmission channel group ("NO" in S305), if the coordinated transmission channel group can be extended ("YES" in S307 of FIG. 23), the wireless communication module 15 sets a primary channel of the target access point AP (S308) and transmits a coordinated transmission channel temporary use notification frame using the primary channel (S309).

When a coordinated transmission channel temporary use response frame is received as a response frame for the coordinated transmission channel temporary use notification frame ("YES" in S310), the wireless communication module 15 extends the coordinated transmission channel group (some frequency channels thereof) for use of the host BSS channel (S311).

Figure 22:
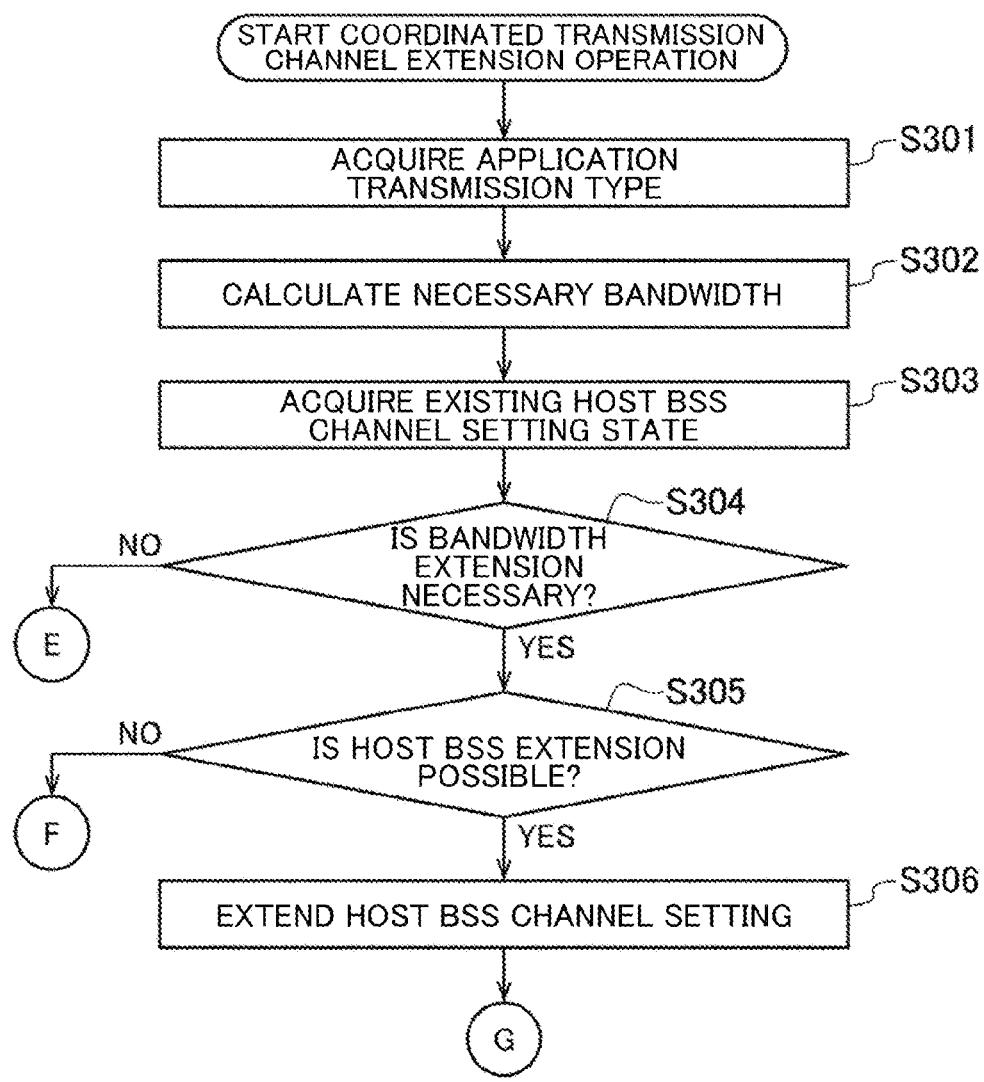
Figure 23:
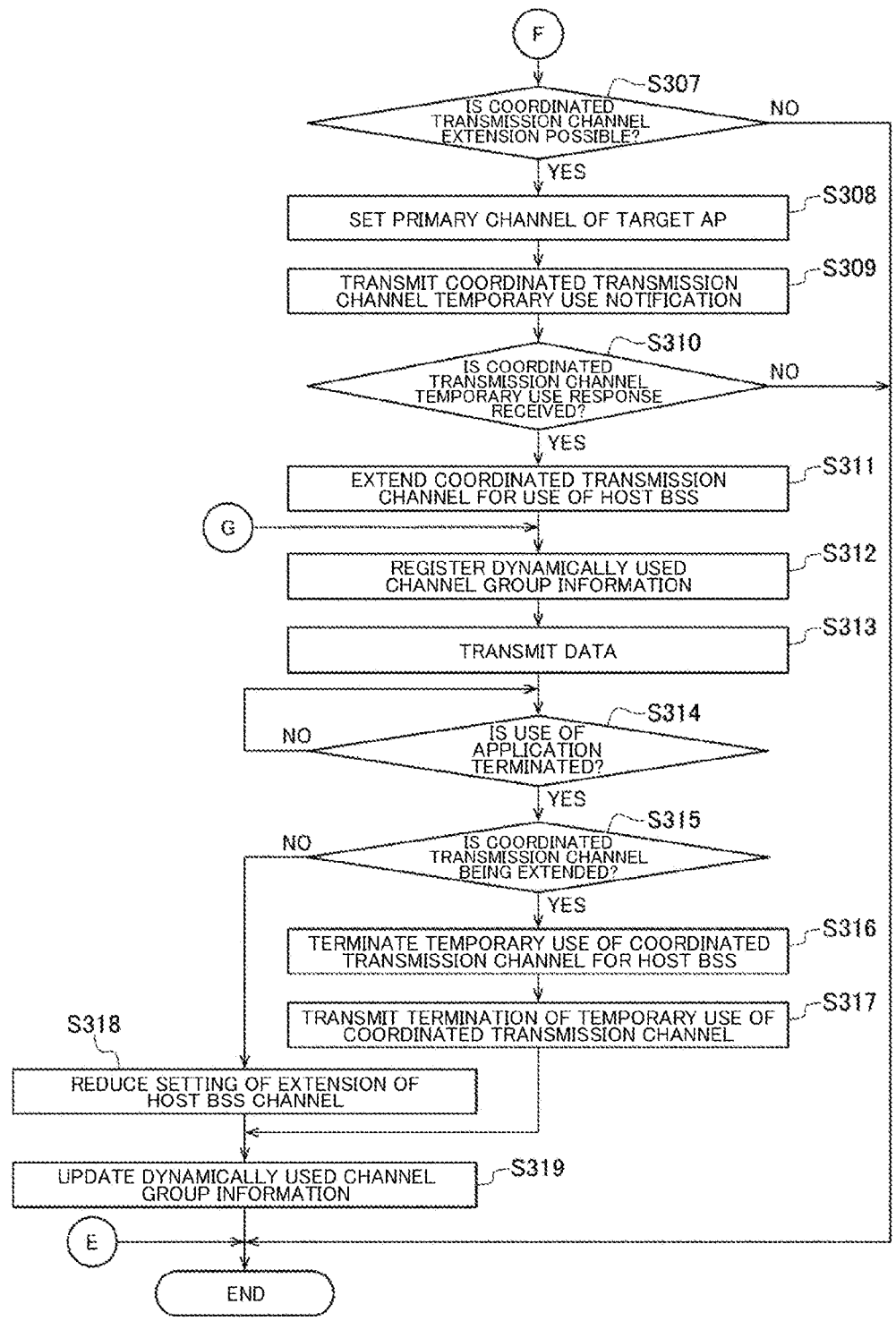

When the bandwidth of the host BSS channel group has been extended using a channel other than the coordinated transmission channel group according to processing of step S306 of FIG. 22, or the bandwidth of the host BSS channel group has been extended using the coordinated transmission channel group (some frequency channels thereof) according to processing of step S311 of FIG. 23, processing proceeds to step S312.

The wireless communication module 15 registers dynamically used channel group information including information on the extended host BSS channel group (S312) and transmits data using the extended host BSS channel group (S313).

Then, when use of the application ends after the data is transmitted ("YES" in S314), if the coordinated transmission channel group is temporarily used at the time of extending the host BSS channel group ("YES" in S315), the wireless communication module 15 ends temporary use of the coordinated transmission channel group (some frequency channels thereof) by the host BSS channel group (S316) and transmits a coordinated transmission channel temporary use end frame (S317).

On the other hand, if the coordinated transmission channel group is not temporarily used at the time of extending the host BSS channel group ("NO" in S315), the wireless communication module 15 reduces extension setting for the host BSS channel group and restores the host BSS channel group to the original state by reducing the extended part thereof while leaving a part in contact with the coordinated transmission channel group (S318).

When processing of step S317 or S318 ends, processing proceeds to step S319. Then, the wireless communication module 15 updates the dynamically used channel group information including information on the reduced host BSS channel group (restored to the original state) (S319) and ends processing.

When it is determined in determination processing of step S304 that bandwidth extension is unnecessary ("NO" in S304), when it is determined in determination processing of step S307 that the coordinated transmission channel group cannot be extended ("NO" in S307), and when it is determined in determination processing of step S310 that the coordinated transmission channel temporary use response frame is not received ("NO" in S310), processing ends.

As described above, in the communication device 10 (the wireless communication module 15 thereof) operating as an access point AP in the wireless communication system to which the present technology is applied, a coordinated transmission channel group used at the time of simultaneously transmitting data in cooperation with another access point constituting an adjacent basic service set OBSS and a host BSS channel group used for communication in a host basic service set BSS are set, and bandwidths of frequency bands in the set coordinated transmission channel group and host BSS channel group are dynamically controlled.

That is, in the wireless communication system to which the present technology is applied, when the same data is cooperatively transmitted from a plurality of access point APs, a frequency channel group (coordinated transmission channel group) used at the time of performing coordinated transmission and a frequency channel group (host BSS channel group) used for communication in the host basic service set BSS are separately managed such that frequency utilization efficiency does not deteriorate.

Accordingly, each access point AP can stably perform coordinated transmission with a neighboring access point AP without deteriorating the throughput of communication in the host basic service set BSS. In other words, it can be said that it is possible to perform coordinated transmission in which data is simultaneously transmitted in cooperation with another networks without hindering the operation of the host network.

Each access point AP can easily simultaneously transmit data in cooperation with a neighboring access point AP by receiving a coordinated transmission channel group setting state from another access point AP and using it to set a coordinated transmission channel group of the host.

In addition, each access point AP can operate an operating frequency band while avoiding conflict of the operating frequency band with a neighboring access point AP by setting a frequency band used in the host BSS channel group such that it is different from a frequency band used for communication in the basic service set OBSS of the access point AP that is the other party. As a result, the effect of improving the throughput can be obtained.

At this time, each access point AP can use a common high-frequency amplification device by setting the frequency band used in the coordinated transmission channel group and the frequency band used in the host BSS channel group adjacent to each other, and thus can perform stable communication.

Further, each access point AP can perform coordinated transmission with another access point AP without hindering communication in the host basic service set BSS by setting the coordinated transmission channel group such that it includes a primary channel of the other access point AP.

That is, each access point AP can perform a transmission operation or a reception operation by individually using the coordinated transmission channel group and the host BSS channel group and does not need to switch frequency channels, and thus can perform communication in the host basic service set BSS without interruption.

Further, each access point AP can dynamically change a frequency channel corresponding to the primary channel of the OBSS channel group used in the basic service set OBSS of the access point AP that is the other party to the coordinated transmission channel group during a negotiation operation at the time of setup of coordinated transmission. Accordingly, it is possible to curb deterioration of the throughput of communication in the host basic service set BSS at the time of setup for performing coordinated transmission.

Each access point AP can extend the host BSS channel group according to the type (for example, transmission type) of an application (started by another communication device, etc.) connected to the host basic service set BSS and can perform communication in the host basic service set BSS using the coordinated transmission channel group (some frequency channels thereof) as a host BSS channel group as necessary. Accordingly, it is possible to flexibly respond to sudden communication demand.

On the other hand, when an application (started by another communication device or the like) connected to the host basic service set BSS is terminated, each access point AP can terminate use of the coordinated transmission channel group (some frequency channels thereof) used as the host BSS channel group for communication in the host basic service set BSS as necessary.

Further, each access point AP can extend the host BSS channel group (frequency band thereof) such that it does not include the coordinated transmission channel group (some frequency channels thereof) when communication (for example, the amount of data) in the host basic service set BSS has increased. On the other hand, each access point AP can terminate use of the extended frequency band and reduce the host BSS channel group (to its original state) when communication (for example, the amount of data) in the host basic service set BSS has decreased.

Further, each access point AP can extend the host BSS channel group (frequency band thereof) such that it includes the coordinated transmission channel group (some frequency channels thereof) when communication (for example, the amount of data) in the host basic service set BSS has increased. On the other hand, each access point AP can terminate use of the extended frequency band and reduce the host BSS channel group (to its original state) when communication (for example, the amount of data) in the host basic service set BSS has decreased.

Here, by separately managing the frequency channel group for performing coordinated transmission (coordinated transmission channel group) and the frequency channel group used for communication in the host basic service set BSS (host BSS channel group), each access point AP can prevent deterioration of the throughput due to interference of an adjacent basic service set OBSS according to management of the host basic service set BSS.

In addition, at the time of extending the host BSS channel group, each access point AP can dynamically switch frequency channels to efficiently operate the network when performing communication in the host basic service set BSS by setting an adjacent frequency channel and adding a bandwidth to be used.

At this time, if a case in which an application that temporarily performs high-speed communication has been started in the host basic service set BSS is assumed, each access point AP can perform communication at a higher speed with higher efficiency without performing coordinated transmission by extending the host BSS channel group using adjacent frequency channels. On the other hand, each access point AP can interchange frequency channels with a neighboring access point AP as needed by opening (some frequency channels of) the coordinated transmission channel group as necessary after use of the application is terminated.

Further, each access point AP can execute an application started by a connected communication device or the like without deteriorating the throughput of normal unicast communication by setting (frequency channels of) a coordinated transmission channel group used to perform coordinated transmission to a frequency band used for multicast communication.

2. Modified Examples (Examples of Other Configurations)

Although a case where the communication device 10 is configured as an access point AP (base station) has been mainly described in the above description, the communication device 10 may be configured as a station STA (terminal station). Here, the communication device 10 may be configured as a part (for example, a wireless communication module, a wireless chip, or the like.) of devices (components) constituting an access point AP or a station STA.

Further, the communication device 10 configured as a station STA can be configured, for example, as an electronic apparatus having a wireless communication function, such as a smartphone, a tablet terminal, a portable music player, a speaker, a digital camera, a game machine, a television receiver, a wearable terminal, a personal computer, a mobile phone, and other home appliances.

Meanwhile, embodiments of the present technology are not limited to the above-described embodiments, and various changes can be made without departing from the gist of the present technology.

In addition, the present technology can take the following configurations.

(1)

A communication device including a control unit configured to set a first frequency channel group used at the time of simultaneously transmitting data in cooperation with another communication device constituting another network, to set a second frequency channel group used for communication in a host network, and to dynamically control bandwidths of frequency bands in the first frequency channel group and the second frequency channel group.

(2)

The communication device according to (1), wherein the control unit acquires channel group information including information on a setting state of the first frequency channel group in the other network, transmitted from the other communication device, and sets the first frequency channel group and the second frequency channel group in the host network on the basis of the acquired channel group information.

(3)

The communication device according to (1) or (2), wherein the control unit sets the frequency band in the second frequency channel group such that the frequency band is different from a frequency band used for communication in the other network.

(4)

The communication device according to any one of (1) to (3), wherein the control unit sets the frequency band in the first frequency channel group and the frequency band in the second frequency channel group adjacent to each other.

(5)

The communication device according to any one of (1) to (4), wherein the control unit sets the first frequency channel group such that the first frequency channel group includes a primary channel of the other network.

(6)

The communication device according to any one of (1) to (5), wherein the control unit controls a transmission operation or a reception operation by individually using the first frequency channel group and the second frequency channel group.

(7)

The communication device according to any one of (1) to (6), wherein the control unit includes a first frequency channel in the first frequency channel group in the second frequency channel group according to a type of an application connected to the host network.

(8)

The communication device according to (7), wherein the control unit terminates use of the first frequency channel in the second frequency channel group according to the type of the application connected to the host network.

(9)

The communication device according to any one of (1) to (6), wherein the control unit extends the second frequency channel group such that the second frequency channel group does not include the first frequency channel group when communication in the host network has increased.

(10)

The communication device according to (9), wherein the control unit terminates use of the extended frequency band and reduces the second frequency channel group when communication in the host network has decreased.

(11)

The communication device according to any one of (1) to (6), wherein the control unit extends the second frequency channel group such that the second frequency channel group includes the first frequency channel group when communication in the host network has increased.

(12)

The communication device according to (11), wherein the control unit terminates use of the extended frequency band and reduces the second frequency channel group when communication in the host network has decreased.

(13)

The communication device according to (2), wherein the channel group information further includes information on the frequency band used for communication in the other network.

(14)

The communication device according to (2), wherein the control unit notifies the other communication device of setting information of the first frequency channel group and the second frequency channel group in the host network in the primary channel of the other network.

(15)

The communication device according to (2), wherein the control unit notifies the other communication device of setting information of a primary channel in the host network in the primary channel of the other network.

(16)

A communication method, using a communication device, including setting a first frequency channel group used at the time of simultaneously transmitting data in cooperation with another communication device constituting another network, setting a second frequency channel group used for communication in a host network, and dynamically controlling bandwidths of frequency bands in the first frequency channel group and the second frequency channel group.

(17)

The communication method according to (16), including acquiring channel group information including information on a setting state of the first frequency channel group in the other network, and setting the first frequency channel group and the second frequency channel group in the host network on the basis of the acquired channel group information.

(18)

The communication method according to (17), wherein the channel group information further includes information on the frequency band used for communication in the other network.

REFERENCE SIGNS LIST

10 Communication device
11 Network connection module
12 Information input module
13 Apparatus control module
14 Information output module
15 Wireless communication module
101 Interface
102 Transmission buffer
103 Transmission sequence management unit
104 Transmission frame construction unit
105 Communication control unit 106 Channel setting unit
107A, 107B Transmission signal processing unit
108 Transmission/reception antenna unit
109A, 109B Reception signal processing unit
110 Received frame analysis unit
111 Received sequence management unit
112 Reception buffer
AP Access point
STA Station

The invention claimed is:

1. A first communication device, comprising:
a control unit configured to:
set a first frequency channel group associated with simultaneous transmission of data from the first communication device and a second communication device,
wherein the first communication device is associated with a first network and the second communication device is associated with a second network;
set a second frequency channel group associated with a first communication in the first network;
determine, based on an increase in the first communication in the first network, the second frequency channel group to one of include the first frequency channel group or not include the first frequency channel group; and
dynamically control a plurality of bandwidths of a plurality of frequency bands, wherein the plurality of frequency bands comprises a first set of frequency bands in the first frequency channel group and a second set of frequency bands in the second frequency channel group.

2. The first communication device according to claim 1, wherein the control unit is further configured to:
acquire channel group information including information on a setting state of the first frequency channel group in the second network;
set the first frequency channel group and the second frequency channel group in the first network based on the acquired channel group information, wherein the channel group information is transmitted from the second communication device; and
control the plurality of bandwidths of the plurality of frequency bands based on the acquired channel group information.

3. The first communication device according to claim 2, wherein
the control unit is further configured to set a first frequency band of the second set of frequency bands in the second frequency channel group,
the first frequency band is different from a second frequency band, and
the second frequency band is associated with a second communication in the second network.

4. The first communication device according to claim 2, wherein
the control unit is further configured to set a first frequency band of the first set of frequency bands in the first frequency channel group and a second frequency band of the second set of frequency bands in the second frequency channel group, and
the first frequency band is adjacent to the second frequency band.

5. The first communication device according to claim 2, wherein the control unit is further configured to set the first frequency channel group to include a primary channel of the second network.

6. The first communication device according to claim 5, wherein the control unit is further configured to control at least one of a transmission operation or a reception operation based on the first frequency channel group and the second frequency channel group.

7. The first communication device according to claim 1, wherein the control unit is further configured to include a first frequency channel of the first frequency channel group in the second frequency channel group based on a type of an application connected to the first network.

8. The first communication device according to claim 7, wherein the control unit is further configured to terminate the first frequency channel in the second frequency channel group based on the type of the application connected to the first network.

9. The first communication device according to claim 1, wherein the control unit is further configured to change, based on the increase in the first communication in the first network, the second frequency channel group to not include the first frequency channel group.

10. The first communication device according to claim 9, wherein the control unit is further configured to:
terminate the changed second frequency channel group based on the first frequency channel group is not included in the changed second frequency channel group; and
reduce the second frequency channel group based on a decrease in the first communication in the first network.

11. The first communication device according to claim 1, wherein the control unit is further configured to change, based on the increase in the first communication in the first network, the second frequency channel group to include the first frequency channel group.

12. The first communication device according to claim 11, wherein the control unit is further configured to:
terminate the changed second frequency channel group based on the first frequency channel group is included in the changed second frequency channel group; and
reduce the second frequency channel group based on a decrease in the first communication in the first network.

13. The first communication device according to claim 2, wherein
the channel group information further includes information on a frequency band of the second set of frequency bands, and
the second set of frequency bands is associated with a second communication in the second network.

14. The first communication device according to claim 2, wherein
the control unit is further configured to notify the second communication device of setting information of the first frequency channel group and the second frequency channel group,
the first frequency channel group and the second frequency channel group are in the first network of a primary channel, and
the primary channel is associated with the second network.

15. The first communication device according to claim 2, wherein
the control unit is further configured to notify the second communication device of setting information of a primary channel in the first network, and
the primary channel is associated with the second network.

16. A communication method, including:

setting a first frequency channel group associated with simultaneous transmission of data from a first communication device and a second communication device,
   wherein the first communication device is associated with a first network and the second communication device is associated with a second network;

setting a second frequency channel group associated with a first communication in the first network;

determining, based on an increase in the first communication in the first network, the second frequency channel group to one of include the first frequency channel group or not include the first frequency channel group; and dynamically controlling a plurality of bandwidths of a plurality of frequency bands, wherein the plurality of frequency bands comprises a first set of frequency bands in the first frequency channel group and a second set of frequency bands in the second frequency channel group.

17. The communication method according to claim 16, further comprising:

acquiring channel group information including information on a setting state of the first frequency channel group in the second network; and setting the first frequency channel group and the second frequency channel group in the first network based on the acquired channel group information.

18. The communication method according to claim 17, wherein
   the channel group information further includes information on a frequency band of the second set of frequency bands, and
   the second set of frequency bands is associated with a second communication in the second network.

* * * * *